US009696806B2

(12) United States Patent
Modarres et al.

(10) Patent No.: US 9,696,806 B2
(45) Date of Patent: Jul. 4, 2017

(54) SYSTEMS AND METHODS FOR MULTI-OUTPUT ELECTROSTATIC HAPTIC EFFECTS

(71) Applicant: Immersion Corporation, San Jose, CA (US)

(72) Inventors: Ali Modarres, Montreal (CA); Juan Manuel Cruz-Hernandez, Montreal (CA); Christopher Ullrich, Ventura, CA (US); Danny Grant, Laval (CA); Neil Olien, Montreal (CA); Vincent Levesque, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 14/322,701

(22) Filed: Jul. 2, 2014

(65) Prior Publication Data

US 2016/0004309 A1  Jan. 7, 2016

(51) Int. Cl.
*G06F 3/01* (2006.01)
*G06F 3/041* (2006.01)

(52) U.S. Cl.
CPC ............ *G06F 3/016* (2013.01); *G06F 3/0412* (2013.01); *G06F 3/0414* (2013.01); *G06F 2203/013* (2013.01); *G06F 2203/014* (2013.01); *G06F 2203/015* (2013.01); *G06F 2203/04106* (2013.01)

(58) Field of Classification Search
CPC .... G06F 3/015; G06F 3/0346; G06F 3/04883; G06F 3/016
See application file for complete search history.

(56) References Cited

U.S. PATENT DOCUMENTS

| 6,337,678 B1 | 1/2002 | Fish |
| 6,819,312 B2 | 11/2004 | Fish |
| 7,336,260 B2 | 2/2008 | Martin et al. |
| RE42,064 E | 1/2011 | Fish |
| 8,917,234 B2 | 12/2014 | Cruz-Hernandez et al. |

(Continued)

FOREIGN PATENT DOCUMENTS

| WO | WO 2010/037894 | 4/2010 |
| WO | WO 2013/007882 | 1/2013 |

OTHER PUBLICATIONS

Burgo et al., Friction coefficient dependence on electrostatic tribocharging, Scientific Reports, 3:2384, pp. 1-8, 2013.

(Continued)

*Primary Examiner* — Shaheda Abdin
(74) *Attorney, Agent, or Firm* — Kilpatrick Townsend & Stockton LLP

(57) ABSTRACT

One illustrative system disclosed herein includes a processor configured to determine a haptic effect, wherein the haptic effect includes a static ESF effect or a confirmation ESF effect; and transmit a haptic signal associated with the haptic effect. The illustrative system also includes an ESF controller in communication with the processor, the ESF controller configured to receive the haptic signal, determine an ESF signal based at least in part on the haptic signal, and transmit the ESF signal. The illustrative system further includes an ESF device in communication with the ESF controller, the ESF device including an ESF cell and configured to receive the ESF signal and output the haptic effect.

22 Claims, 11 Drawing Sheets

(56) References Cited

U.S. PATENT DOCUMENTS

| | | |
|---|---|---|
| 2008/0218488 A1 | 9/2008 | Yang et al. |
| 2009/0079550 A1 | 3/2009 | Makinen et al. |
| 2010/0152794 A1 | 6/2010 | Radivojevic et al. |
| 2010/0171715 A1 | 7/2010 | Peterson |
| 2010/0283731 A1 | 11/2010 | Grant et al. |
| 2010/0289740 A1 | 11/2010 | Kim |
| 2011/0051360 A1* | 3/2011 | Dabov ............... G06F 1/1626 361/679.55 |
| 2011/0109588 A1 | 5/2011 | Makinen |
| 2011/0285667 A1 | 11/2011 | Poupyrev et al. |
| 2012/0142379 A1* | 6/2012 | Park ............... H04M 1/72572 455/457 |
| 2012/0229400 A1* | 9/2012 | Birnbaum ............... G06F 3/016 345/173 |
| 2012/0229401 A1 | 9/2012 | Birnbaum et al. |
| 2012/0268412 A1 | 10/2012 | Cruz-Hernandez et al. |
| 2012/0287068 A1 | 11/2012 | Colgate |
| 2012/0327006 A1 | 12/2012 | Israr |
| 2013/0002570 A1* | 1/2013 | Ogg ............... G06F 3/016 345/173 |
| 2013/0164543 A1 | 6/2013 | Shibuya |
| 2013/0307789 A1 | 11/2013 | Karamath et al. |
| 2013/0314303 A1 | 11/2013 | Osterhout et al. |
| 2015/0123775 A1 | 5/2015 | Kerdemelidis |
| 2015/0355710 A1 | 12/2015 | Modarres et al. |

OTHER PUBLICATIONS

Lee et al., A Haptic Touchscreen Interface for Mobile Devices, ICMI'13 Proceedings of the 15th ACM on International Conference on Multimodal Interaction, pp. 311-312, 2013.

Yamamoto et al., A 2-DOF electrostatic sheet conveyer using wire mesh for desktop automation, Proceedings of the 2006 IEEE International Conference on Robotics and Automation, Orlando FL, May 2006, pp. 2208-2213.

European Patent Office, Extended European Search Report, Application No. 15174407 dated Oct. 29, 2015.

United States Patent and Trademark Office, Office Action, U.S. Appl. No. 14/297,012 dated May 16, 2016.

United States Patent and Trademark Office, Office Action, U.S. Appl. No. 14/322,697 dated Apr. 20, 2016.

* cited by examiner

SYSTEMS AND METHODS FOR MULTI-OUTPUT ELECTROSTATIC HAPTIC EFFECTS

FIELD OF THE INVENTION

The present invention relates to the field of user interface devices. More specifically, the present invention relates to multi-output electrostatic haptic effects.

BACKGROUND

As computer-based systems become more prevalent, the quality of the interfaces through which humans interact with these systems is becoming increasingly important. One interface that is of growing popularity due to its intuitive and interactive nature is the touchscreen display. Through a touchscreen display, a user can perform a variety of tasks by contacting a region of the touchscreen with the user's finger. In order to create a more intuitive and enhanced user experience, designers often leverage user experience with physical interactions. This is generally done by reproducing some aspects of interactions with the physical world through visual, audio, and/or haptic feedback. Haptic feedback often takes the form of a mechanical vibration. There is a need for additional systems and methods to generate haptic feedback.

SUMMARY

Embodiments of the present disclosure comprise computing devices featuring multi-output electrostatic force (ESF) haptic effects. In one embodiment, a system of the present disclosure may comprise a processor configured to determine a haptic effect, wherein the haptic effect comprises a static ESF effect or a confirmation ESF effect; and transmit a haptic signal associated with the haptic effect. The system may also comprise an ESF controller in communication with the processor, the ESF controller configured to receive the haptic signal, determine an ESF signal based at least in part on the haptic signal, and transmit the ESF signal. The system may further comprise an ESF device in communication with the ESF controller, the ESF device comprising an ESF cell and configured to receive the ESF signal and output the haptic effect.

In another embodiment, a method of the present disclosure may comprise: determining a haptic effect, wherein the haptic effect comprises a static ESF effect or a confirmation ESF effect; transmitting a haptic signal associated with the haptic effect to an ESF controller; and determining an ESF signal based at least in part on the haptic signal. The method may further comprise transmitting the ESF signal to an ESF device configured to output the haptic effect, the ESF device comprising an ESF cell; and outputting the haptic effect. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

FIG. 14b shows another view of the embodiment of a system for providing multi-output electrostatic haptic effects shown in FIG. 14a;

DETAILED DESCRIPTION

Figure 1:
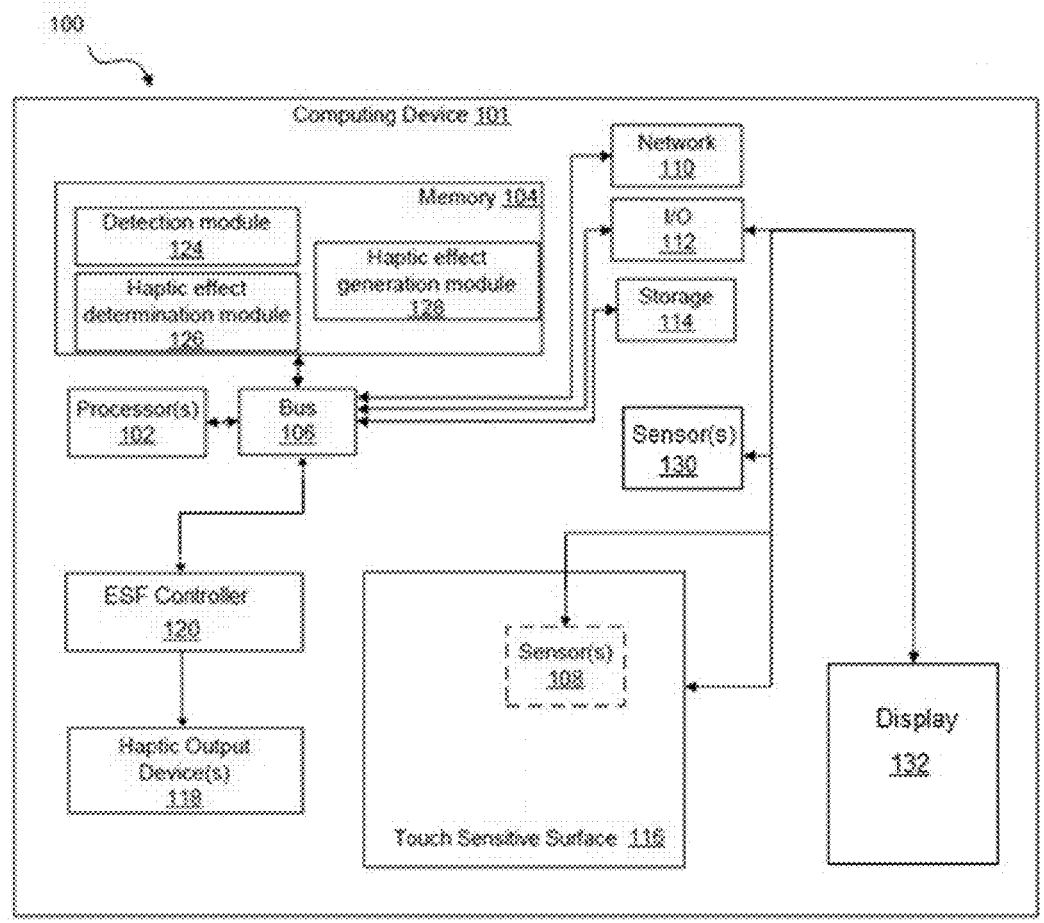
FIG. 1 is a block diagram showing a system for providing multi-output electrostatic haptic effects according to one embodiment.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of Multi-output Electrostatic Haptic Effects

One illustrative embodiment of the present disclosure comprises a gaming system. The gaming system includes a game console in communication with a user interface device, such as a game controller, smart phone, or tablet. Such gaming systems may include, for example, gaming systems commonly sold under the trademarks Microsoft Xbox®, Sony PlayStation®, Nintendo Wii®, or the Sega Zone®. The user interface devices may comprise and/or may be in communication with one or more user input elements configured to detect a user input. Such user input elements may comprise, for example, a game controller, button, joystick, gyroscope, accelerometer, or touch-sensitive surface, any of which can be alone or in combination with one another.

In the illustrative embodiment, the gaming system is in communication with a haptic feedback device. The haptic feedback device is configured to receive a signal from the gaming system and provide an electrostatic force feedback (ESF) haptic effect perceivable by a user. A haptic feedback device configured to output ESF haptic effects will hereinafter be referred to as an "ESF device."

In the illustrative embodiment, the ESF device comprises a three-by-three matrix of ESF cells, each ESF cell comprising an electrode coupled to an insulator. In the illustrative embodiment, the ESF device is positioned on the user interface device to directly contact the user's hand. Further, in the illustrative embodiment, the surface area of the ESF device is smaller than the contact area between the user's hand and the user interface device.

The ESF device uses electrostatic attraction to output a haptic effect to the user. In the illustrative embodiment, the gaming system applies an electric signal to one or more of the electrodes of the ESF cells. The electric signal may generate a charge on each electrode. This charge may generate capacitive coupling between the electrode and an object (e.g., the user's hand or finger) near or touching the surfaces of the ESF cells. The capacitive coupling of the object with ESF cells produces a haptic effect.

In the illustrative embodiment, the user does not have to move a body part across a surface associated with the ESF device to perceive the haptic effect. Nor does the user have to move a body part in the direction perpendicular to the surface associated with the ESF device to perceive the haptic effect. Rather, the user may maintain continuous contact (e.g., by gripping or holding) with a surface associated with the ESF device and perceive the ESF haptic effect. An ESF haptic effect that is perceptible to a user without user movement in the directions tangential or perpendicular to a surface will be referred to hereinafter as a "static ESF effect." For example, a static ESF effect may simulate movement (hereinafter referred to as a "flow sensation") across a surface, such as the surface of the user interface device, even though the user's hand may not move relative to the surface. In some embodiments, applying a sequential signal to the ESF cells may produce such a static ESF effect. Other static ESF effects may comprise, for example, a simulated vibration, a change in a perceived coefficient of friction, or a simulated texture.

In the illustrative embodiment, the game system outputs a haptic effect, via the ESF device, in response to an event. An event, as used herein, is any interaction, action, collision, or other event which occurs during operation of the device which can potentially comprise an associated haptic effect. In some embodiments, an event may comprise user input (e.g., a button press, manipulating a joystick, interacting with a touch-sensitive surface, tilting or orienting the user interface device), a system status (e.g., low battery, low memory, or a system notification, such as a notification generated based on the system receiving an incoming call), sending data, receiving data, or a program event (e.g., if the program is a game, a program event may comprise explosions, gunshots, collisions, interactions between game characters, advancing to a new level, or driving over bumpy terrain). For example, in the illustrative embodiment, the gaming system outputs a haptic effect (e.g., a simulated vibration) upon the occurrence of a game event (e.g., when the user's virtual character is shot).

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Multi-output Electrostatic Haptic Effects

Figure 3:
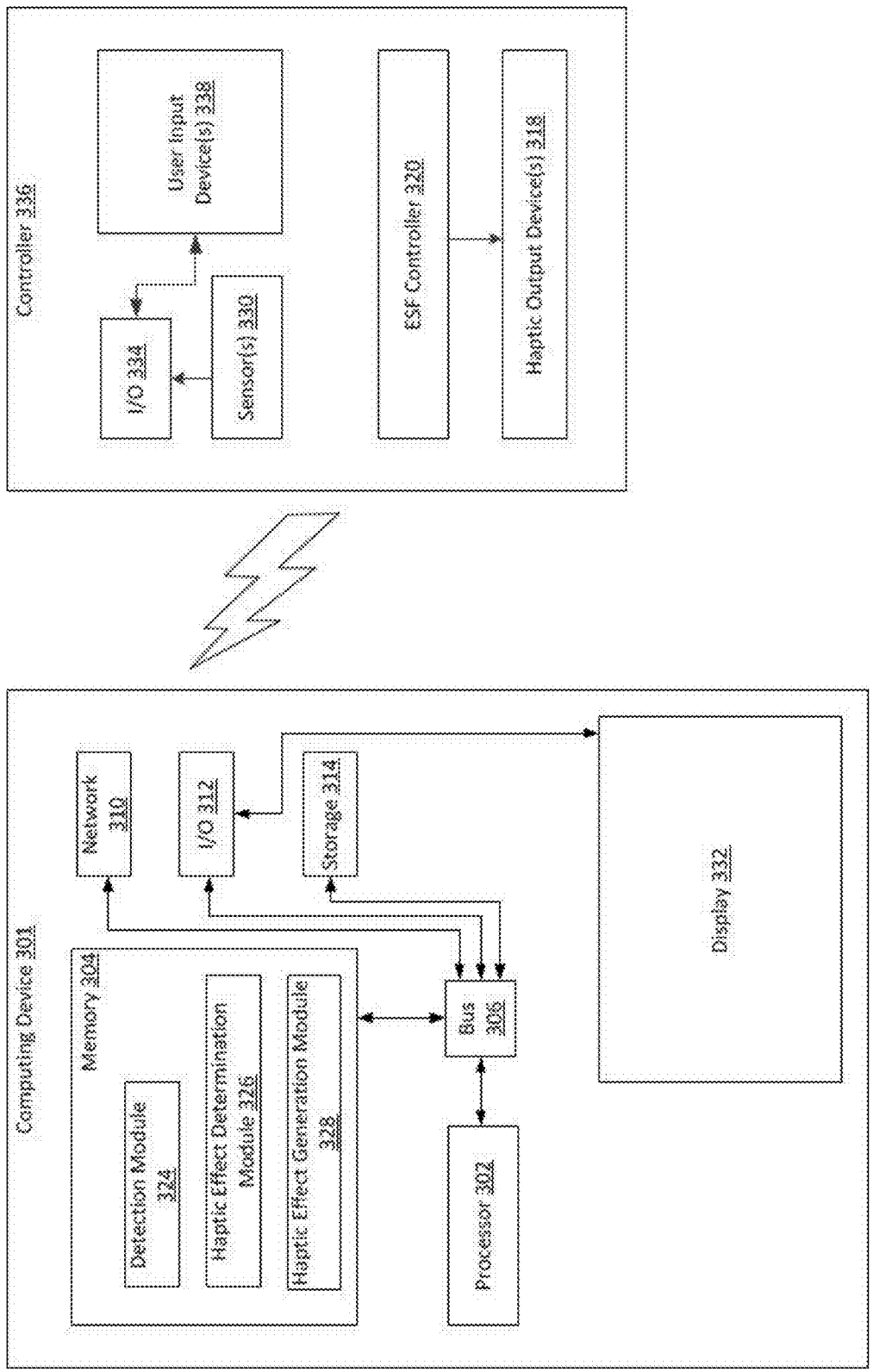
FIG. 3 is another block diagram showing a system for providing multi-output electrostatic haptic effects according to one embodiment.

FIG. 1 is a block diagram showing a system 100 for providing multi-output electrostatic haptic effects according to one embodiment. In the embodiment shown, system 100 comprises a computing device 101 having a processor 102 in communication with other hardware via bus 106. Computing device 101 may comprise, for example, a smartphone, tablet, e-reader, or portable gaming device. While system 100 is shown as a single device in FIG. 1, in other embodiments, the system 100 may comprise multiple devices as shown in FIG. 3, such as a game console and one or more game controllers.

A memory 104, which can comprise any suitable tangible (and non-transitory) computer-readable medium such as RAM, ROM, EEPROM, or the like, embodies program components that configure operation of the computing device 101. In the embodiment shown, computing device 101 further includes one or more network interface devices 110, input/output (I/O) interface components 112, and storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate wired or wireless connection to devices such as one or more displays 132, game controllers, keyboards, mice, joysticks, buttons, speakers, microphones, and/or other hardware used to input data or output data. Storage 114 represents nonvolatile storage such as magnetic, optical, or other storage media included in device 101 or coupled to processor 102.

System 100 further includes a touch sensitive surface 116, which, in this example, is integrated into computing device 101. Touch sensitive surface 116 represents any surface that is configured to sense tactile input of a user. One or more sensors 108 are configured to detect a touch in a touch area when an object contacts a touch sensitive surface 116 and provide appropriate data for use by processor 102. Any suitable number, type, or arrangement of sensors can be used. For example, resistive and/or capacitive sensors may be embedded in touch sensitive surface 116 and used to determine the location of a touch and other information, such as pressure. As another example, optical sensors with a view of the touch sensitive surface 116 may be used to determine the touch position.

In other embodiments, the sensor 108 may comprise a LED detector. For example, in one embodiment, touch sensitive surface 116 may comprise a LED finger detector mounted on the side of a display 132. In some embodiments, the processor 102 is in communication with a single sensor 108, in other embodiments, the processor 102 is in communication with a plurality of sensors 108, for example, a first touch sensitive surface and a second touch sensitive surface. The sensor 108 is configured to detect user interaction, and based on the user interaction, transmit signals to processor 102. In some embodiments, sensor 108 may be configured to detect multiple aspects of the user interaction. For example, sensor 108 may detect the speed, pressure, or direction of a user interaction, and incorporate this information into the interface signal.

Touch sensitive surface 116 may or may not comprise (or otherwise correspond to) a display 132, depending on the particular configuration of the system 100. Some embodiments include a touch enabled display that combines a touch sensitive surface 116 and a display 132 of the device. The touch sensitive surface 116 may correspond to the display 132 exterior or one or more layers of material above the actual display 132 components. In other embodiments, a computing device 101 comprises a touch-sensitive surface 116 which may be mapped to a graphical user interface provided in a display 132 that is included in system 100 interfaced to computing device 101.

In the embodiment shown, computing device 101 comprises one or more additional sensors 130. Sensor 130 is configured to transmit sensor signals to processor 102. In some embodiments, the sensor 130 may comprise a gyroscope, an accelerometer, a global positioning (GPS) unit, a temperature sensor, a humidity sensor, an ambient light sensor, and/or other sensors for detecting motion, location, and/or environmental characteristics. In some embodiments, the sensor 130 may comprise a resistive, capacitive, or other sensor configured to detect a contact and/or contact surface area between a user and a surface associated with the computing device 101 and/or the haptic output device 118. In some embodiments, the processor 102 is in communication with a single sensor 130, in other embodiments, the processor 102 is in communication with a plurality of sensors 130, for example, a gyroscope and an accelerometer. Further, in some embodiments, the sensor 130 may be in communication with haptic output device 118. Although in the embodiment shown in FIG. 1 depicts the sensor 130 internal to computing device 101, in some embodiments, sensor 130 may be external to computing device 101. For example, in some embodiments, the one or more sensors 130 may be associated with a wearable device (e.g., a ring, bracelet, sleeve, collar, hat, shirt, glove, or glasses) and/or coupled to a user's body.

The embodiment shown also includes an ESF controller 120. ESF controller 120 is configured to receive a haptic signal from processor 102, determine an ESF signal to output to a haptic output device 118, and then transmit the ESF signal. The ESF signal comprises a signal configured to cause the haptic output device 118 to output a haptic effect associated with the haptic signal. In some embodiments, the ESF signal may comprise an AC signal. Although in the example shown in FIG. 1 the ESF controller 120 is internal to computing device 101, in other embodiments, the ESF controller 120 may be external to and in communication with the computing device 101 (see, e.g., FIG. 3). The ESF controller 120 may be in communication with the computing device 101 via wired interfaces such as Ethernet, USB, IEEE 1394, and/or wireless interfaces such as IEEE 802.11, Bluetooth, or radio interfaces.

In some embodiments, the ESF controller 120 may comprise a crystal oscillator, a relay, a multiplexer, an amplifier, a switch, and/or other means for generating an ESF signal. For example, in some embodiments, the ESF controller 120 may comprise a switch coupling one or more conductors in an ESF device to a high voltage source. In such an embodiment, the haptic signal may cause ESF controller 120 to oscillate the switch, so that an ESF signal comprising high voltage is transmitted to the conductors in a pattern configured to generate the desired ESF haptic effect. As another example, in some embodiments, the ESF controller 120 may comprise a multiplexer coupling one or more conductors in an ESF device to an AC voltage source. Based on the haptic signal, the ESF controller 120 may control the multiplexer so that an ESF signal comprising AC voltage is transmitted to the conductors in a pattern configured to generate the desired ESF haptic effect. Further, in some embodiments, the ESF controller 120 may comprise a processor, a microcontroller, memory, a field programmable gate array (FPGA), a transistor, a flip-flop, and/or other digital or analog circuitry.

The system 100 further includes haptic output device 118 in communication with ESF controller 120. Haptic output device 118 is configured to output a haptic effect that can be sensed by a user. Haptic output device 118 uses electrostatic attraction to output an ESF haptic effect to a user. In some embodiments, the ESF haptic effect may comprise a static ESF effect. In some embodiments, the ESF haptic effect may comprise a "confirmation ESF effect." A confirmation ESF effect comprises an ESF effect perceptible to a user upon the user moving a body part (e.g., a finger) perpendicularly to a surface associated with the haptic output device 118, such that the user contacts the surface for a short duration (e.g., less than 1 s) (e.g., if the user taps the surface). For example, in some embodiments, upon a user tapping a virtual button (e.g., a virtual keyboard key) or moving a virtual dial, the haptic output device 118 may output a confirmation ESF effect comprising, for example, a simulated vibration. In some embodiments, the confirmation ESF effect may provide the user with information, for example, a confirmation that the computing device 101 has received the user's input. Further, in some embodiments, the ESF haptic effect may comprise a "dynamic ESF effect." A dynamic ESF effect comprises an ESF effect perceptible to a user upon the user sliding a body part tangentially along a surface associated with the haptic output device 118. In some embodiments, the ESF haptic effect may comprise a simulated vibration, a change in a perceived coefficient of friction, a simulated texture, or a flow sensation in response to an ESF signal. Haptic output device 118 may be either rigid or flexible.

Figure 2:
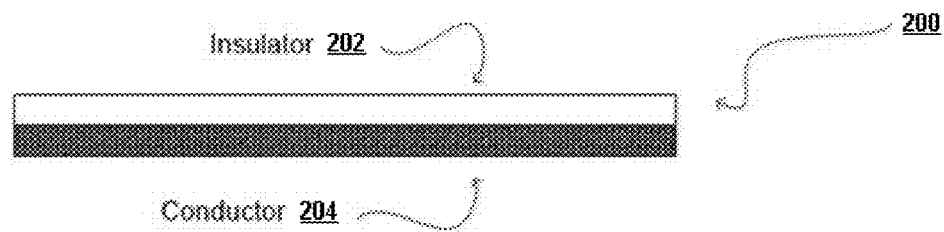
FIG. 2 shows an embodiment of a system for providing multi-output electrostatic haptic effects.

Haptic output device 118 comprises at least one ESF device, which comprises at least one ESF cell. An ESF cell comprises a conductor coupled to an insulator. One example embodiment of an ESF cell is shown in FIG. 2. The conductor 204 comprises a semiconductor or conductive material, for example, copper, tin, iron, aluminum, gold, silver, or carbon nanotubes. In some embodiments, the conductor 204 may be flexible and/or may be transparent.

The insulator 202 comprises an insulating material, for example, glass, porcelain, plastic, polymer, fiberglass, nitrogen, or sulfur hexafluoride. The insulator 202 may be flexible. In some embodiments, the insulator 202 may comprise a dielectric material and/or a transparent material. In some embodiments, the insulator 202 may comprise a thickness of 15 to 40 microns. In some embodiments, as the thickness of the insulator 202 increases in size (e.g., above 40 microns), the strength of a haptic effect perceived by a user may decrease. Further, in some embodiments, as the thickness of the insulator 202 decreases in size below a threshold (e.g., 15 microns), the strength or quality of the haptic effect perceived by the user may decrease. In some embodiments, an appropriate thickness for the insulator 202 may be based on the amount of voltage the computing device may apply to the ESF cell 200. For instance, in some embodiments, the insulator 202 may be thicker if the computing device may transmit 1,000 V to the ESF cell 200 than if the computing device may transmit 100 V to the ESF cell 200, e.g., to actuate the ESF cell 200. In some embodiments, the touch sensitive surface 116 may comprise the insulator 202, the conductor 204, or both.

Further, in some embodiments, the insulator 202 may be configured to directly contact the user's skin. In other embodiments, a material (e.g., clothing, a touch sensitive surface, a computing device housing, a fluid or gel, or an adhesive) may be positioned between the insulator 202 and the user's skin. In some embodiments, the material positioned between the insulator 202 and the user's skin may improve the contact between the ESF cell 200 and the user's skin.

The computing device controls an ESF cell 200 by applying an electric signal to the conductor 204. The electric signal may be an AC signal. In some embodiments, the AC signal may be generated by a high-voltage amplifier. The strength of the haptic effect perceived by the user may be based on the magnitude of the voltage of the electric signal. For example, in some embodiments, a user may perceive a haptic effect generated from an electric signal comprising 1000 V as stronger than a haptic effect generated from an electric signal comprising 100 V. In some embodiments, the computing device may send a haptic signal to an ESF controller, which may output one or more electric signals (i.e., ESF signals) to the conductors 204 of one or more ESF cells 200. Applying an electric signal to the conductor 204 may induce an electric charge on the conductor 204. In some embodiments, the charge on the conductor 204 may create capacitive coupling between the conductor 204 and an object near or touching the ESF cell 200, for example, a user's palm. A user may perceive the capacitive coupling as a haptic effect. For example, in one embodiment, the capacitive coupling produces attractive forces between parts of the body or an object near the surface of one or more ESF cells 200. The attractive forces stimulate the nerve endings in the skin of a user's body, for example, the user's palm. This stimulation may allow the user to perceive the ESF haptic effect (e.g., the capacitive coupling) as a vibration or some other sensation. In some embodiments, varying the level of attraction between the object and the conductor 204 may vary the ESF haptic effect felt by the user.

Referring back to FIG. 1, in some embodiments, haptic output device 118 may further comprise additional haptic output devices in addition to one or more ESF devices of the type described above. For example, haptic output device 118 may comprise one or more of a piezoelectric actuator, an electric motor, an electro-magnetic actuator, a voice coil, a shape memory alloy, an electro-active polymer, a solenoid, an ERM, or a linear resonant actuator (LRA). Further, some haptic effects may utilize an actuator coupled to a housing of the computing device 101, and some haptic effects may use multiple actuators of the same or different types in sequence and/or in concert. Although a single haptic output device 118 is shown here, embodiments may use multiple haptic output devices 118 of the same or different type to produce haptic effects. For example, in some embodiments, multiple vibrating actuators and ESF devices can be used alone or in concert to provide different haptic effects. Further, although haptic output devices 118 is shown internal to computing device 101 in FIG. 1, in other embodiments, haptic output devices 118 may be associated with another device that is external to and in communication with the computing device 101 (see, e.g., FIG. 3). The haptic output devices 118 may be in communication with the computing device 101 via wired interfaces such as Ethernet, USB, IEEE 1394, and/or wireless interfaces such as IEEE 802.11, Bluetooth, or radio interfaces.

Turning to memory 104, illustrative program components 124, 126, and 128 are depicted to illustrate how a device can be configured in some embodiments to provide multi-output electrostatic haptic effects. In this example, a detection module 124 configures processor 102 to monitor touch sensitive surface 116 via sensor 108 to determine a position of a touch. For example, module 124 may sample sensor 108 in order to track the presence or absence of a touch and, if a touch is present, to track one or more of the location, path, velocity, acceleration, pressure and/or other characteristics of the touch over time.

Haptic effect determination module 126 represents a program component that analyzes data to select a haptic effect to generate. Particularly, haptic effect determination module 126 may comprise code that determines a haptic effect to output to the user. Further, haptic effect determination module 126 may comprise code that selects one or more haptic effects to provide, and/or one or more haptic output devices 118 (e.g., one or more ESF devices or cells within ESF devices) to actuate, in order to simulate the haptic effect.

In some embodiments, haptic effect determination module 126 may comprise code that determines, based on an interaction with the touch sensitive surface 116, a haptic effect to output and code that selects one or more haptic effects to provide in order to output the effect. For example, in some embodiments, some or all of the area of touch sensitive surface 116 may be mapped to a graphical user interface (GUI), for example, a GUI output on display 132. Upon a user interacting with the GUI via touch sensitive surface 116 (e.g., tapping or making a gesture, such as a two-finger pinch, on the touch sensitive surface 116), haptic effect determination module 126 may select different haptic effects based on the location of the interaction. In some embodiments, the haptic effects may allow a user to perceive a feature on the GUI, for example, a virtual button. However, haptic effects may be provided via haptic output device 118 even if a corresponding feature is not displayed in the GUI (e.g., a haptic effect may be provided if a boundary in the GUI is crossed, even if the boundary is not displayed).

In some embodiments, haptic effect determination module 126 may determine haptic effects based on other kinds of events. For example, in some embodiments, haptic effect determination module 126 may determine a haptic effect based on a system status (e.g., a low battery status). In some embodiments, the characteristics of the haptic effect may depend on the characteristics of the system status (e.g., the magnitude of the haptic effect may be inversely proportional to the amount of battery life left). As another example, in some embodiments, haptic effect determination module 126 may determine a haptic effect based on a program event (e.g., an error notification). In some embodiments, the characteristics of the haptic effect may depend on the characteristics of the program event (e.g., the type of haptic effect may be based on the type of error).

In some embodiments, haptic effect determination module 126 may determine a haptic effect based in part on signals from sensor 130. For example, in some embodiments, the sensor 130 may comprise a gyroscope and/or accelerometer. In some embodiments, if the user tilts or moves the computing device 101, haptic effect determination module 126 may determine a haptic effect (e.g., a simulated vibration) based in part on signals from the gyroscope and/or accelerometer. For example, in some embodiments, the magnitude of the haptic effect may be determined such that it is proportional to the amount in degrees that the user tilts the computing device 101 and/or the speed in which the user moves the computing device 101. Further, in some embodiments, the sensor 130 may comprise a resistive or capacitive sensor. In some embodiments, the haptic effect determination module 126 may determine a haptic effect based on a contact, or an area of contact, between the user (e.g., the user's finger) and a surface associated with the haptic output device 118 (e.g., the touch sensitive surface 116). For example, in some embodiments, as the contact area between the user and a surface associated with the haptic output device 118 increases, the user may perceive a stronger haptic effect. In response, the haptic effect determination module 126 may determine a haptic effect comprising a decreased magnitude. The decreased magnitude may offset the effect of the increased contact area between the user and the surface associated with the haptic output device 118, so that the user perceives the overall haptic effect as having a relatively constant strength.

Haptic effect generation module 128 represents programming that causes processor 102 to generate and transmit a haptic signal to the ESF controller 120 to generate the selected haptic effect. For example, the haptic effect generation module 128 may access stored waveforms or commands to send to ESF controller 120. As another example, haptic effect generation module 128 may comprise algorithms to determine the haptic signal. Haptic effect generation module 128 may comprise algorithms to determine target coordinates for the haptic effect. These target coordinates may comprise, for example, a location on the touch sensitive surface 116.

FIG. 3 is another block diagram showing a system for providing multi-output electrostatic haptic effects according to one embodiment. In the embodiment shown, system 300 comprises a computing device 301 having a processor 302 in communication with other hardware via bus 306. Computing device 301 may comprise, for example, a game console, laptop computer, or desktop computer.

Computing device 301 also comprises a memory 304, which comprises a detection module 324, haptic effect determination module 326, and haptic effect generation module 328. These components may be configured to function in similar ways as the memory, detection module, haptic effect determination module, and haptic effect generation module depicted in FIG. 1.

Further, computing device 301 comprises network components 310, I/O components 312, storage 314, and a display 332. In some embodiments, these components may be configured to function in similar ways as the network components, I/O components, storage, and display depicted in FIG. 1. In some embodiments, display 332 may comprise a separate component, e.g., a remote monitor, television, or projector coupled to processor 302 via a wired or wireless connection.

System 300 also includes a controller 336. In some embodiments, the controller 336 may comprise, for example, a game controller, a mouse, or a gear shifter. In some embodiments, controller 336 may comprise a processor and/or network components 310. In this example, controller 336 is in communication with computing device 301 via a wireless interface, such as IEEE 802.11, Bluetooth, or radio interfaces (e.g., transceiver/antenna for accessing a CDMA, GSM, UMTS, or other mobile communications network). Controller 336 comprises I/O components 334, which may be configured to function in similar ways as the I/O components depicted in FIG. 1.

Controller 336 also comprises one or more user input device(s) 338. The user input device 338 comprises a device for interacting with the controller 336, for example, a joystick, directional pad, button, switch, speaker, microphone, touch sensitive surface, and/or other hardware used to input data or output data.

Controller 336 further comprises one or more sensors 330. The sensor 330 is configured to transmit sensor signals to processor 302. In some embodiments, the sensor 330 may comprise a gyroscope, an accelerometer, a GPS unit, a temperature sensor, a humidity sensor, an ambient light sensor, and/or other sensors for detecting motion, location, and/or environmental characteristics. In some embodiments, sensor 330 may comprise a plurality of sensors 330, for example, a gyroscope and an accelerometer. In some embodiments, sensor 330 may be in communication with haptic output device 318. In some embodiments, the sensor 330 may comprise a resistive, capacitive, or other sensor configured to detect a contact and/or contact area between a user and a surface associated with the haptic output device 318, the computing device 301, and/or the controller 336.

In the example shown in FIG. 3, the controller 336 includes an ESF controller 320, which may be configured to function similarly to the ESF controller shown in FIG. 1. The ESF controller 320 is in communication with computing device 301 and configured to receive a haptic signal from processor 302, determine an ESF signal to be output to a haptic output device 318, and then transmit the ESF signal.

Controller 336 also comprises a haptic output device 318, which may be configured to function similarly to the haptic output device shown in FIG. 1. Haptic output device 318 is configured to output a haptic effect that can be sensed by a user. Haptic output device 318 comprises at least one ESF device and uses electrostatic attraction to output a haptic effect to a user. Further, as discussed above with regard to the haptic output device 118 depicted in FIG. 1, in some embodiments, haptic output device 318 may comprise additional haptic output devices (e.g., a haptic output device configured to output a vibration) of the same or different type. In some embodiments, computing device 301 may actuate multiple haptic output devices 318 of the same or different type to produce a haptic effect. For example, in some embodiments, multiple ESF devices can be used alone or in concert to provide different haptic effects. In some embodiments, the haptic output device 318 may be configured to output a static ESF effect or a confirmation ESF effect.

Figure 4:
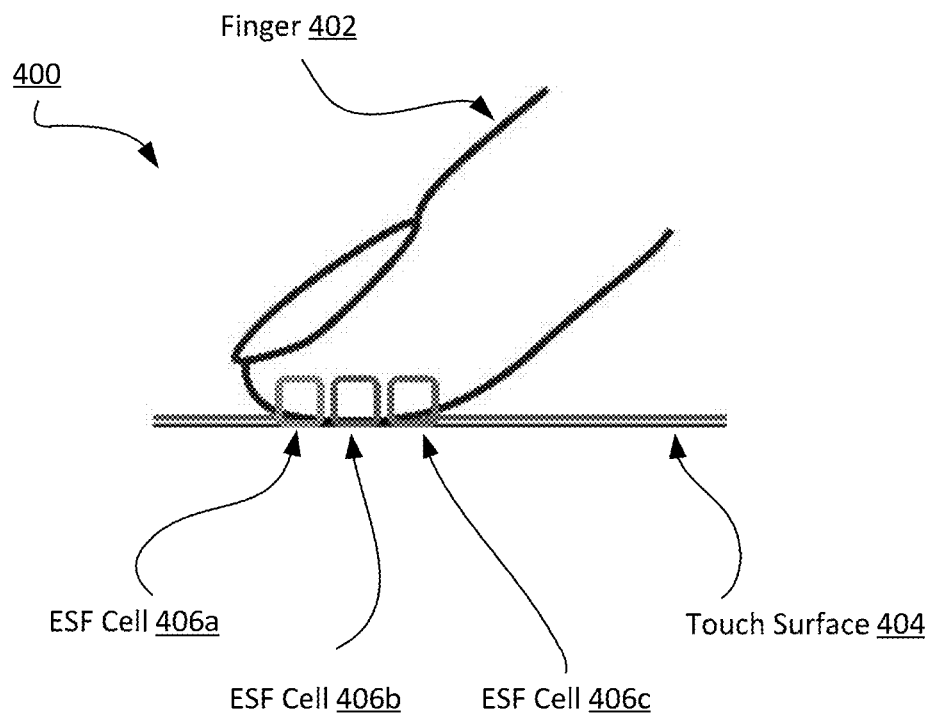
FIG. 4 shows an external view of a system for providing multi-output electrostatic haptic effects according to another embodiment.

FIG. 4 shows an external view of a system for providing multi-output electrostatic haptic effects according to another embodiment. In this example, a user has pressed a finger 402 against the touch surface 404. The touch surface 404 comprises three ESF cells 306a-c positioned linearly along the touch surface 404. In this example, the combined surface area of the ESF cells 406a-c is smaller than the contact area between the user's finger 402 and the touch surface 404. Although the ESF cells 406a-c are depicted in this example as having roughly equal surface areas, in other embodiments, the surface area of each of the ESF cells 406a-c may be different from one another.

In some embodiments, upon the occurrence of an event, the system 400 may output a static ESF effect or a confirmation ESF effect. An ESF controller may individually control each of the ESF cells 406a-c to output the static ESF effect or the confirmation ESF effect. In some embodiments, the ESF controller may actuate two or more of the ESF cells 406a-c in concert to output the static ESF effect or the confirmation ESF effect. For example, in some embodiments, the ESF controller may actuate the first ESF cell 406a and the third ESF cell 406c, but not the second ESF cell 406b. In other embodiments, the ESF controller may actuate the first ESF cell 406a and the second ESF cell 406b, but not the third ESF cell 406c.

In some embodiments, the ESF controller may actuate the ESF cells 406a-c with ESF signals of differing polarities. For example, in some embodiments, the ESF controller may actuate the first ESF cell 406a with an ESF signal comprising a positive polarity and the third ESF cell 406c with an ESF signal comprising a negative polarity. The positive polarity of the ESF cell 406a may generate a negatively charged region in the user's finger 402. The negative polarity of the ESF cell 406c may generate a positively charged region in the user's finger 402. In some embodiments, the negatively charged region in the user's finger 402 may attract the positively charged region in the user's finger 402. In some embodiments, the attraction of charged regions within the user's finger 402 may generate or enhance the static ESF effect or the confirmation ESF effect perceived by the user.

In some embodiments, the ESF controller may actuate the ESF cells 406a-c in sequence to output a static ESF effect or a confirmation ESF effect. For example, the ESF controller may actuate the first ESF cell 406a, then the second ESF cell 406b, then the third ESF cell 406c. In some embodiments, the ESF controller may stop actuating an ESF cell (e.g., the first ESF cell 406a) upon actuating a different ESF cell (e.g., the next ESF cell) in the sequence. In other embodiments, the ESF controller may continue actuating an ESF cell (e.g., the first ESF cell 406a) upon actuating a different ESF cell in the sequence. In some embodiments, the user may perceive sequentially actuated ESF cells 406a-c as a static ESF effect or a confirmation ESF effect comprising a flow sensation. In some embodiments, the flow sensation may be faster (e.g., each of the ESF cells 406a-c may be actuated 50 ms apart), while in other embodiments the flow sensation may be slower (e.g., each of the ESF cells 406a-c may be actuated 125 ms apart). Further, in some embodiments, the ESF cells 406a-c may be configured in other arrangements, as shown in FIGS. 5-8.

Figure 5:
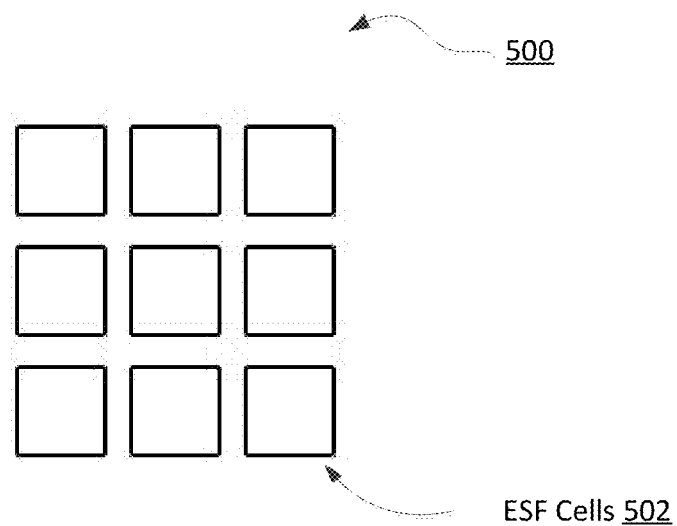
FIG. 5 shows an embodiment of a system for providing multi-output electrostatic haptic effects.

FIG. 5 shows an embodiment of a system for providing multi-output electrostatic haptic effects. In this example, the ESF device 500 comprises a three-by-three matrix of square ESF cells 502. In some embodiments, the strength of the ESF haptic effect (e.g., the static ESF effect or the confirmation ESF effect) perceived by the user may depend on the combined surface area of the ESF cells 502. In some embodiments, the size of the combined surface area of the ESF cells 502 may be smaller than the contact area between a user's finger and a touch surface. As the size of the combined surface area of the ESF cells 502 increases, the strength of the ESF haptic effect perceived by the user may increase, until a threshold size is reached. In some embodiments, the threshold size may comprise the size of the contact area between the user's finger and the touch surface.

The configuration and properties of the ESF cells 502 impact how a user perceives the ESF haptic effect. For example, the area of each ESF cell 502, the shape of each ESF cell 502, and/or the spacing between the ESF cells 502 impact how the user perceives the haptic effect. For example, in some embodiments, as the area of each ESF cell 506 increases, the strength of the ESF haptic effect perceived by a user may increase. In some embodiments, the ESF cells 506 may comprise rectangular, circular, comb, triangular, or other shapes. In some embodiments, each of the ESF cells 506 may have different areas, thicknesses, and/or shapes. In some embodiments, the spacing between each ESF cell 502 may be the same or may be different. For example, in some embodiments, some of the ESF cells 502 may have a 0.7 mm spacing between them, while others may have a 0.25 mm spacing between them. In some embodiments, as the size of the spacing between ESF cells 502 increases beyond a threshold (e.g., 0.7 mm), the strength of the ESF haptic effect perceived by the user may decrease. Any number of areas, shapes, spacing, and/or configurations of ESF cells 502 may be possible.

Figure 6:
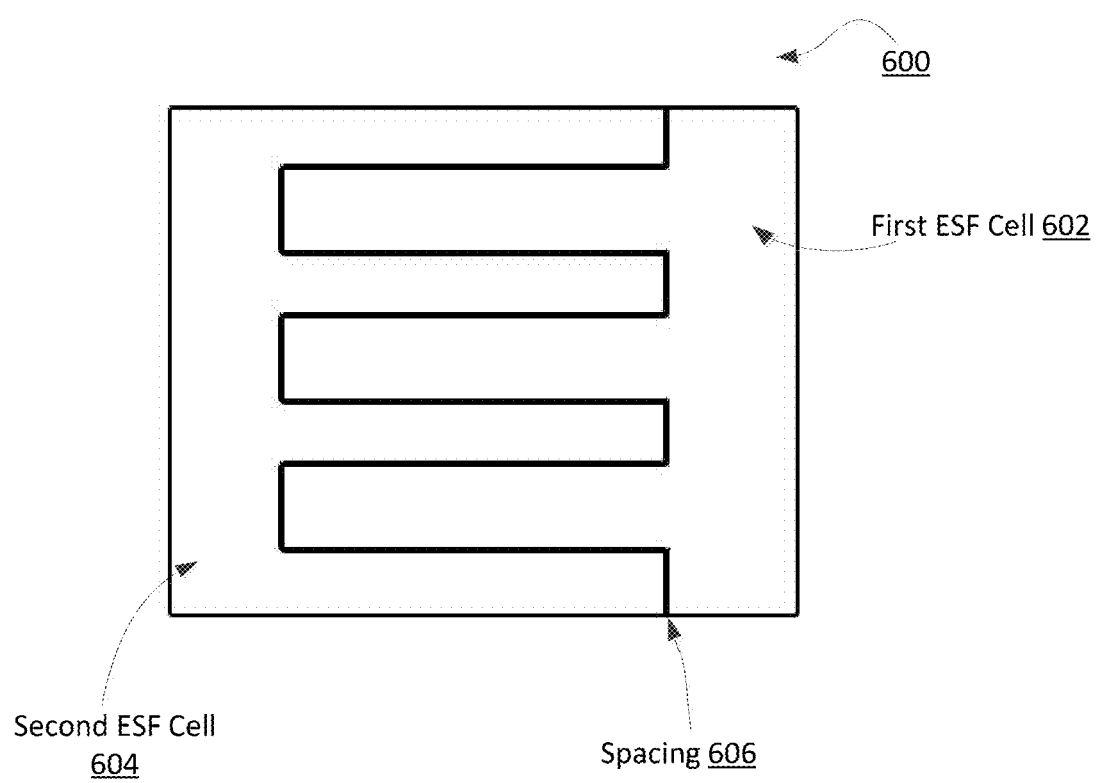
FIG. 6 shows another embodiment of a system for providing multi-output electrostatic haptic effects.

FIG. 6 shows another embodiment of a system for providing multi-output electrostatic haptic effects. In this example, the ESF device 600 comprises a first ESF cell 602 interlocking with a second ESF cell 604. In some embodiments, the size of the combined surface area of the interlocking ESF cells 602 and 604 may be smaller than the contact area between a user's finger and a touch surface.

The configuration and properties of the ESF cells 602, 604 impacts how a user perceives the ESF haptic effect (e.g., the static ESF effect or the confirmation ESF effect). In some embodiments, the size of the spacing 606 between the first ESF cell 602 and the second ESF cell 604 may affect the haptic effect perceived by the user. Further, in some embodiments, the lengths, widths, and/or number of interlocking members may affect the haptic effect perceived by the user. For example, in some embodiments, as the lengths and/or widths of the interlocking members increase, the user may perceive a stronger haptic effect.

Figure 7:
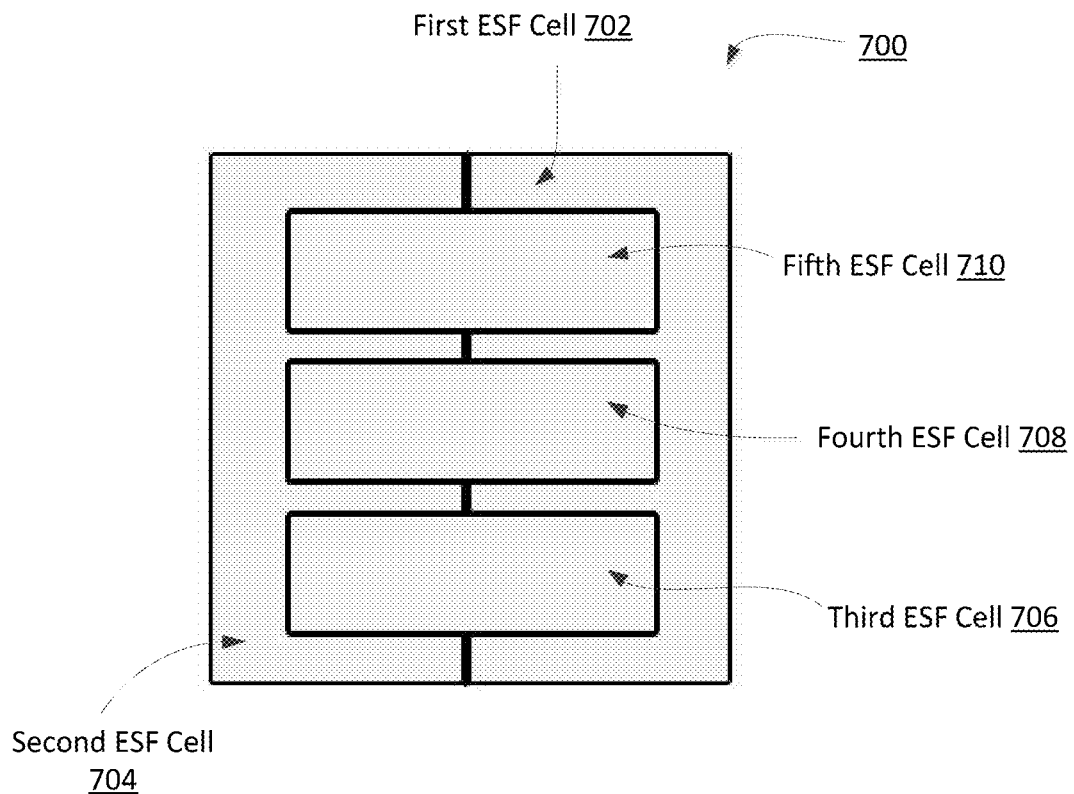
FIG. 7 shows yet another embodiment of a system for providing multi-output electrostatic haptic effects.

FIG. 7 shows an embodiment of a system for providing multi-output electrostatic haptic effects. In this example, ESF device 700 comprises a first ESF cell 702 and a second ESF cell 704, with ESF cells 706, 708, 710 in the middle. In some embodiments, the size of the combined surface area of the ESF cells 702, 704, 706, 708, 710 may be smaller than the contact area between a user's finger and a touch surface.

The configuration and properties of the ESF cells 702, 704, 706, 708, 710 impacts how a user perceives the ESF haptic effect (e.g., the static ESF effect or the confirmation ESF effect). In some embodiments, the ESF cells 706, 708, and 710 may comprise other shapes, for example, circles, triangles, squares, or hexagons. In some embodiments, there may be more or fewer ESF cells 706, 708, 710. In some embodiments, the spacing between the ESF cells 702, 704, 706, 708, 710 may affect how the user perceives the haptic effect. In some embodiments, the dimensions (e.g., the length and/or width) of the ESF cells 706, 708, 710 may affect the haptic effect perceived by the user. For example, in some embodiments, as the length and/or width of the ESF cells 706, 708, 710 increase, the strength of the haptic effect perceived by the user may increase.

Figure 8:
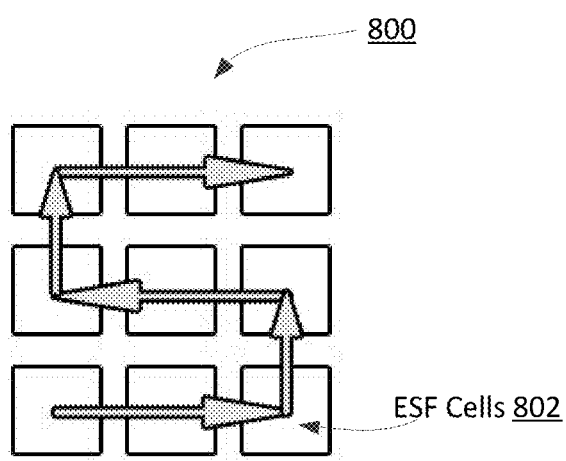
FIG. 8 shows still another embodiment of a system for providing multi-output electrostatic haptic effects.

FIG. 8 shows another embodiment of a system for providing multi-output electrostatic haptic effects. In this example, an ESF device 800 comprises ESF cells 802 that are arranged in a three-by-three matrix.

The ESF controller outputs ESF haptic effects (e.g., static ESF effects or confirmation ESF effects) by applying one or more ESF signals to one or more ESF cells 802. The ESF controller may actuate the ESF cells 802 in series or in concert to output an ESF haptic effect. In the embodiment shown, the ESF controller is actuating the ESF cells 802 sequentially in an "S" formation corresponding to the arrows shown in the figure. That is, the ESF controller may start by actuating the ESF cell 802 in the lower left corner of the three-by-three matrix, and continue actuating ESF cells 802 along the path shown by the arrows in FIG. 8, ending with the ESF cell 802 in the upper right corner. In some embodiments, sequentially activating the ESF cells 802 in an "S" formation may output a static ESF effect or a confirmation ESF effect comprising a two-dimensional flow sensation. In other embodiments, the ESF controller may actuate the ESF cells 802 in other patterns or configurations.

In some embodiments, the characteristics of the ESF haptic effect perceived by the user may depend on a characteristic of the ESF signal. For example, in some embodiments, the strength of the haptic effect perceived by the user may increase as the magnitude of the ESF signal increases. In some embodiments, the strength of the haptic effect perceived by the user may increase as the frequency of the ESF signal increases (e.g., from 50 Hz to 300 Hz). For example, in some embodiments, a user may perceive a haptic effect generated by an ESF signal comprising a 300 Hz frequency as stronger than a haptic effect generated by an ESF signal comprising a 50 Hz frequency. In some embodiments, the ESF signal may have a waveform comprising, for example, a sine wave, a saw tooth wave, a square wave, or a triangle wave. In some embodiments, a user may perceive a haptic effect as stronger or more pleasant if the ESF controller actuates the one or more ESF cells 802 with an ESF signal comprising a sinusoid or square wave. In some embodiments, a user may perceive a haptic effect as weaker if the ESF signal comprises a short (e.g., 5 s to 10 s) duration.

In some embodiments, the characteristics of the ESF haptic effect perceived by the user may depend on a plurality of ESF signal characteristics (e.g., the amplitude, frequency, time duration, polarity, and/or waveform). For example, in some embodiments, the characteristics of the haptic effect perceived by the user may depend on the ESF signal's waveform and voltage. For instance, in some embodiments, the user may perceive an haptic effect as weak or "buzzy" if the ESF signal comprises a high voltage (e.g., 500 V) and a square waveform.

In some embodiments, the ESF controller may actuate one or more of the ESF cells 802 by applying ESF signals of varying amplitudes, frequencies, time durations, polarities, and/or waveforms to the one or more ESF cells 802. For example, in some embodiments, the ESF controller may output an ESF signal comprising multiple sinusoids. In some embodiments, the sinusoids may have different frequencies, magnitudes, and/or polarities from one or more of the other sinusoids. For example, in one embodiment, the ESF controller delivers a sine wave with a 50 Hz frequency to an ESF cell 802, a sine wave with a 100 Hz frequency to another ESF cell 802, and a sine wave with a 150 Hz frequency to still another ESF cell 802. In some embodiments, a user may perceive an ESF haptic effect as stronger if the ESF controller delivers sinusoids comprising different frequencies to the ESF cells 802 than if the ESF controller delivers sinusoids of the same frequency to the ESF cells 802. In some embodiments, there may be a time delay between each of the sinusoids. In other embodiments, there may be no time delay between each of the sinusoids. ESF signals comprising any number of magnitudes, waveforms, frequencies, durations, polarities, and/or actuation patterns may be possible.

Figure 9:
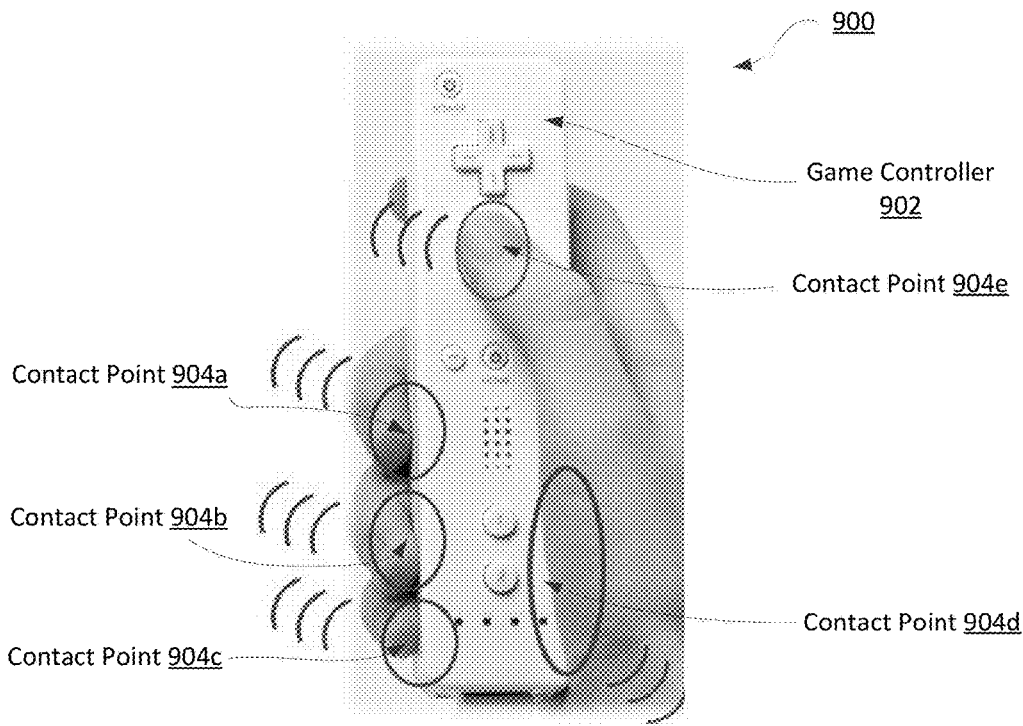
FIG. 9 shows an embodiment of an external view of a system for providing multi-output electrostatic haptic effects.

FIG. 9 shows an embodiment of an external view of a system for providing multi-output electrostatic haptic effects. In this example, system 900 comprises a game controller 902, e.g., a controller for playing a video game on a game system. In other embodiments, system 900 may comprise any suitable manipulable device. A manipulable device is a device configured to be manipulated by a user and may include devices that can be held or grasped. For example, in some embodiments, a manipulable device may comprise a laptop computer, a desktop computer, a gear shifter, a steering wheel, a mouse, a keyboard, a joystick, a button, a stylus, a tablet, an e-reader, a remote control, a gamepad, a mobile device, or a mobile device holder. Such devices may be, for example, standalone devices or may be controls incorporated into mobile devices, automotive dashboards, or other control surfaces.

As shown in FIG. 9, the game controller 902 comprises a series of buttons and a housing. The housing further comprises contact points 904a-e, through which the user's hand contacts the game controller 902. In some embodiments, each of the contact points may comprise an ESF device (not shown), which in turn comprises one or more ESF cells. In some embodiments, the system 900 may output one or more haptic effects (e.g., static ESF effects or confirmation ESF effects of the types described above) via the one or more ESF devices associated with the contact points 904a-e. In some embodiments, the system 900 may actuate each of the ESF devices corresponding to contact points 904a-e sequentially or in concert to output one or more haptic effects.

For example, in some embodiments, a user may use the game controller 902 to play a video game, such as a tennis game. Upon the occurrence of an event, such as the user swinging the game controller 902 to hit a virtual tennis ball, the system 900 may output haptic effects via ESF devices associated with contact points 904a-e. For example, in some embodiments, the system 900 may output a haptic effect configured to emulate interacting with a real tennis racket. In some embodiments, the system 900 may sequentially actuate the ESF devices (and/or the ESF cells inside the ESF devices) associated with the contact points 904a-c to generate a flow sensation. This flow sensation may, in some embodiments, mimic the slip of a tennis racket in a user's hand as the user swings the racket. Further, in some embodiments, the system 900 may actuate the ESF devices associated with contact points 904d-e to generate a simulated vibration. This simulated vibration may, in some embodiments, mimic the vibration a user feels in the user's hand when the user's tennis racket contacts a ball. In some embodiments, the combination of these effects may provide a more realistic gaming experience, for example a more realistic virtual tennis experience, to a user.

As another example, in some embodiments, the user may be playing a video game in which the user drives a virtual automobile. In some embodiments, the system 900 may output a haptic effect associated with the automobile. For example, the system 900 may output a flow sensation by actuating each of the ESF devices corresponding to contact points 904a-e sequentially. In some embodiments, the speed of the actuation of the ESF devices associated with contact points 904a-e may be associated with how fast the user is driving the virtual automobile. In one embodiment, the faster the user drives the automobile, the faster the system 900 actuates the ESF devices (and/or the ESF cells within the ESF devices). Further, in some embodiments, the system 900 may output a haptic effect comprising a texture via one or more ESF devices corresponding to contact points 904a-e. In some embodiments, the texture may be associated with the texture (e.g., smooth, rough, bumpy) of a virtual object.

For example, the texture may be associated with the road surface over which the virtual automobile is driving.

In some embodiments, a computing device (e.g., the game controller 902) may comprise a plurality of sensors (e.g., pressure and/or capacitive sensors). For example, in some embodiments, the entire surface (or substantially the entire surface) of a computing device may comprise sensors. In some embodiments, the system 900 may determine, based on sensor signals from the sensors, that the user may be contacting specific points on the computing device. The system 900 may further determine a characteristic (e.g., the pressure, direction, velocity, or the surface area of the contact between the user and the computing device) of each contact. In some embodiments, based on the contacts, and/or the determined characteristics of the contacts, the system 900 may determine how the user may be holding the computing device (e.g., if the user is left-handed or right-handed, or the configuration of the user's fingers).

Further, in some embodiments, the system 900 may determine an ESF haptic effect based on the contacts, and/or the determined characteristics of the contacts. For example, in some embodiments, the entire surface (or substantially the entire surface) of the game controller 902 may comprise ESF devices. The system 900 may determine a haptic effect based on which surfaces of the game controller 902 and/or ESF devices the user may be contacting. In some embodiments, the system 900 may determine a haptic effect based on the amount of pressure with which the user may be contacting the surface. In some embodiments, the system 900 may determine a haptic effect based on the size of the contact surface area between the user and the surface. Further, in some embodiments, the system 900 may determine one or more ESF devices through which to output the haptic effect. For example, in some embodiments, the system 900 may output the haptic effect via ESF devices associated with the user's points of contact (e.g., contact points 904a-e) with the computing device.

Figure 10:
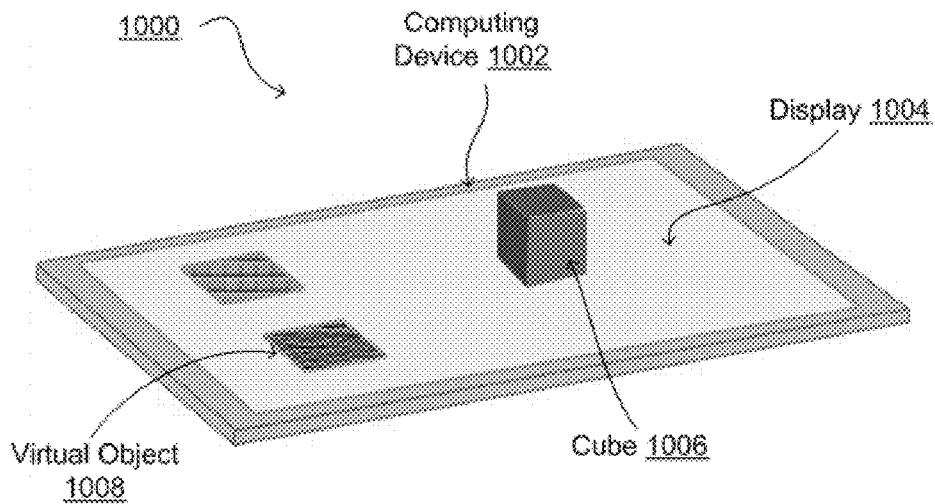
FIG. 10 shows another embodiment of an external view of a system for providing multi-output electrostatic haptic effects.

FIG. 10 shows another embodiment of an external view of a system for providing multi-output electrostatic haptic effects. In this example, system 1000 comprises a computing device 1002 with a display 1004. In some embodiments, the computing device 1002 may comprise, for example, a tablet, laptop, or smart phone. In the example shown in FIG. 10, the display 1004 is outputting a user interface comprising virtual objects 1008, the virtual objects 1008 comprising squares with varying colors and textures. In some embodiments, a user may interact with the computing device 1002 and/or the virtual objects 1008 by manipulating objects in real space. In this example, the user may interact with the computing device 1002 and/or the virtual objects 1008 by manipulating a cube 1006.

In some embodiments, the object in real space (e.g., the cube 1006) may comprise one or more ESF devices for outputting a haptic effect to a user. For example, in some embodiments, the cube 1006 may have one or more ESF devices on each of its sides. In some embodiments, each ESF device may comprise a different configuration of ESF cells. In other embodiments, each ESF device may comprise the same configuration of ESF cells.

In some embodiments, the system 1000 may output a haptic effect, such as simulated textures, flow sensations, and/or simulated vibrations, via one or more of the ESF devices. In some embodiments, the system 1000 may output the haptic effect upon the occurrence of an event. In some embodiments, an event may comprise, for example, a user interacting with a virtual object 1008 via an object in real space (e.g., cube 1006). For example, in some embodiments, upon the user placing the cube 1006 over a location on the display 1004 associated with a virtual object 1008, the system 1000 may output a haptic effect via one or more of the ESF devices. In some embodiments, the haptic effect may be associated with the texture of the virtual object 1008. For example, in some embodiments, upon the user placing the cube 1006 over the virtual object 1008, which may comprise a bumpy texture, the system 1000 may output a haptic effect comprising a bumpy texture.

In some embodiments, the computing device 1002 may comprise (or be in communication with) a user interface in real space, for example, a board game such as Monopoly®. In some embodiments, a user may interact with the computing device 1002 by manipulating an object in real space, for example, a game piece. In response, the system 1000 may output a haptic effect via one or more ESF devices associated with the object in real space. In some embodiments, the haptic effect may be based on the positioning of the object in real space. For example, in some embodiments, upon a user placing a game piece on a Monopoly® board in a location associated with the railroad, the system 1000 may output a haptic effect comprising, for example, a vibration configured to simulate the rumbling of a moving train. Similarly, in some embodiments, upon the user placing the game piece on the Monopoly® board in a location associated with jail, the system 1000 may output a haptic effect comprising, for example, a metal texture configured to simulate jail bars.

Figure 11:
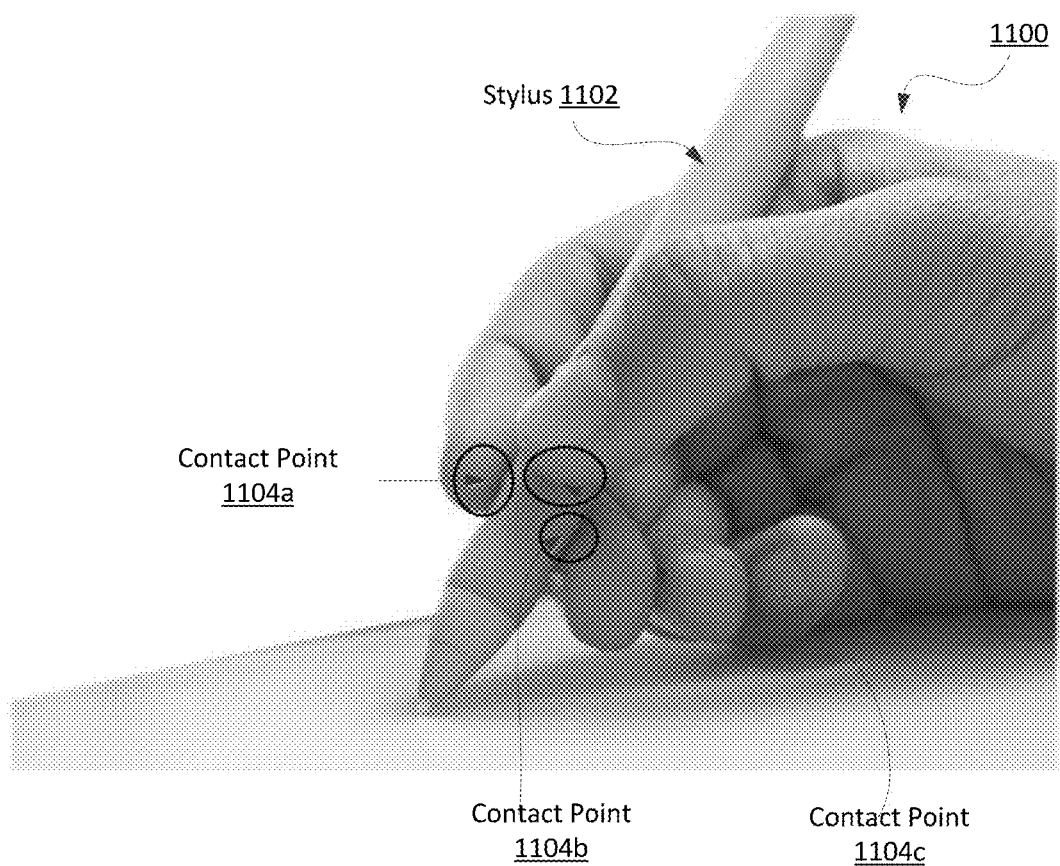
FIG. 11 shows yet another embodiment of an external view of a system for providing multi-output electrostatic haptic effects.

FIG. 11 shows another embodiment of an external view of a system for providing multi-output electrostatic haptic effects. In this example, the system 1100 comprises a stylus 1102 held by a user. In some embodiments, contact points 1104a-c, through which a user's fingers contact the stylus 1102, comprise ESF devices (not shown) for outputting haptic effects to the user.

In some embodiments, the system 1100 may output one or more haptic effects (e.g., static ESF effects or confirmation ESF effects) via the one or more ESF devices associated with the contact points 1104a-c. In some embodiments, the system 1100 may output one or more haptic effects upon the occurrence of an event. In this example, an event may comprise, for example, holding, moving, tilting, or otherwise manipulating the stylus 1102, or an interaction between the stylus 1102 and an object (e.g., a person or surface). For example, an event may comprise positioning the stylus 1102 over a location on a touch sensitive surface associated with a virtual object, tapping the stylus 1102 on the touch sensitive surface, or moving the stylus 1102 along the surface of the touch sensitive surface. In some embodiments, upon a user tapping the stylus 1102 on a touch sensitive surface, the system 1100 may output one or more haptic effects (e.g., simulated vibrations) to one or more contact points 1104a-c. In some embodiments, such haptic effects may provide confirmation to the user that the tap has been received by the system 1100.

In some embodiments, a user may interact with virtual buttons, keyboard keys, or other virtual objects on a touch sensitive surface (e.g., a touch screen or touch pad on a smart phone, tablet, e-reader, or laptop computer) using the stylus 1102. As the user interacts with a virtual object with stylus 1102, the system 1100 may output haptic effects via one or more ESF devices associated with contact points 1104a-c. In some embodiments, the one or more haptic effects may be associated with the virtual object. For example, in some embodiments, the user may slide the stylus 1102 to the left along a touch sensitive surface comprising a virtual keyboard. In response, the system 1100 may output haptic effects on the left side of the stylus 1102 as the user transitions from one key to the next key. Likewise, in some embodiments, the user may slide the stylus 1102 to the right along the touch sensitive surface. In response, the system 1100 may output haptic effects on the right side of the stylus 1102 as the user transitions from one key to the next key.

In some embodiments, as a user interacts with a virtual object, the system 1100 may output a haptic effect associated with a texture of the virtual object. For example, in some embodiments, a doctor may be exploring a virtual X-ray image of a patient's teeth using a stylus 1102. As the doctor positions the stylus 1102 over different parts of the virtual image of the patient's teeth, the system 1100 may output one or more haptic effects via the one or more ESF devices associated with the contact points 1104*a-c*. In some embodiments, the one or more haptic effects may simulate a texture associated with the part of the teeth over which the stylus 1102 is positioned. For instance, if the doctor positions the stylus 1102 over an area on the virtual image associated with a bumpy area on the patient's tooth, the system 1100 may output haptic effect simulating the bumpy texture. Similarly, if the doctor positions the stylus 1102 on an area of the virtual image associated with a smooth area on the patient's tooth, the system 1100 may output a haptic effect simulating the smooth texture.

In some embodiments, as a user interacts with a virtual object, the system 1100 outputs a haptic effect associated with gripping or holding the object in real space. For example, in some embodiments, a user may be interacting with a virtual brick using stylus 1102. The user may press, with the stylus 1102, on a location on a touch sensitive interface (e.g., touch screen or touch pad) associated with the brick in order to "grip" the brick, and may drag the stylus 1102 in order to move the virtual brick in the virtual environment. As the user grips and drags the brick, the system 1100 may output one or more haptic effects via one or more ESF devices associated with contact points 1104*a-c*. In some embodiments, the haptic effects may simulate the feeling of gripping a brick (e.g., a rough, bumpy texture) and/or moving it (e.g., a low magnitude vibration).

In some embodiments, a user may input and/or determine which haptic effects are associated with particular events. For example, in some embodiments, a user may be able to associate a virtual button press with a haptic effect comprising, for example, a simulated vibration, a simulated texture, or a flow sensation. In some embodiments, the user may be able to select from a list of available haptic effects and associate the haptic effect with one or more events. Further, in some embodiments, the user may be able to input and/or determine which ESF device(s) output the haptic effect. For example, in one embodiment, the user may associate a haptic effect comprising a simulated texture with a virtual button press, and assign the ESF device associated with contact point 1104*b* to output the haptic effect.

Figure 12:
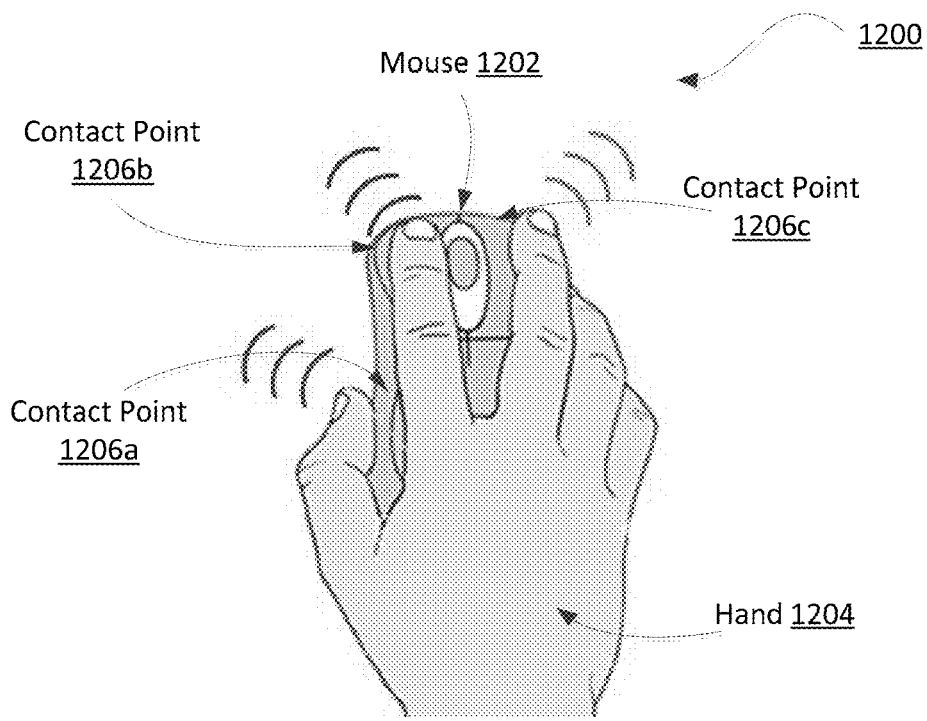
FIG. 12 shows an embodiment of an external view of a system for providing multi-output electrostatic haptic effects.

FIG. 12 shows an embodiment of an external view of a system for providing multi-output electrostatic haptic effects. In this example, system 1200 comprises a user's hand 1204 holding a mouse 1202. In some embodiments, contact points 1206*a-c*, in which the user's hand 1204 contacts the mouse 1202, comprise ESF devices (not shown) for outputting haptic effects to the user. In embodiments, each of the ESF devices comprises one or more ESF cells.

In some embodiments, the system 1200 may output one or more haptic effects via the ESF devices associated with the contact points 1206*a-c*. In some embodiments, the system 1200 may output one or more haptic effects via one or more ESF devices upon the occurrence of an event. In some embodiments, an event may comprise pressing a mouse button, hovering the mouse over a virtual object (e.g., an icon, program, window, or menu), or otherwise interacting with a virtual object. For example, in some embodiments, upon the user hovering the mouse 1202 over a certain virtual object, the system 1200 may output a haptic effect (e.g., a static ESF effect) via ESF devices associated with one or more contact points 1206*a-c*. In some embodiments, this haptic effect may convey information (e.g., priority, importance, guidance information, or object type) to the user about the virtual object over which the mouse is hovering.

In some embodiments, the system 1200 may output haptic effects to provide guidance information to a user. In some embodiments, the haptic effects may be based on a user interaction with a virtual object. For example, in some embodiments, upon the user hovering the mouse 1202 over a virtual object, one or more haptic effects may be output to one or more contact points 1206*a-c*. Such haptic effects may inform the user as to which button (e.g., the left mouse button, the right mouse button, or a thumb button) the user should use to select the virtual object. For example, in some embodiments, the user may hover the mouse 1202 over a window and, in response, the system 1200 may output a haptic effect comprising a simulated vibration. In some embodiments, the simulated vibration may be output via an ESF device associated with contact point 1206*b*, which may be associated with the left mouse button. The simulated vibration may, in some embodiments, indicate that the user should select the window by clicking the left mouse button and/or that other mouse 1202 buttons may be disabled.

In some embodiments, the system 1200 may output haptic effects upon the occurrence of a button press. For example, if the user presses the right mouse button, the system 1200 may output a haptic effect (e.g., a simulated vibration) via an ESF device associated with contact point 1206*c*, which is associated with the right mouse button. In some embodiments, the haptic effect may provide a confirmation to the user. For example, a confirmation that the system 1200 has received the input, that an object that the user is trying to select cannot be (or has been) selected, or that the mouse pointer is not located in the correct spot on the virtual object. Any number of ESF devices, configured in any number of arrangements, and located on any number of contact points on a device (e.g., a mouse 1202) may be used to provide haptic effects to a user for any number of reasons.

Figure 13:
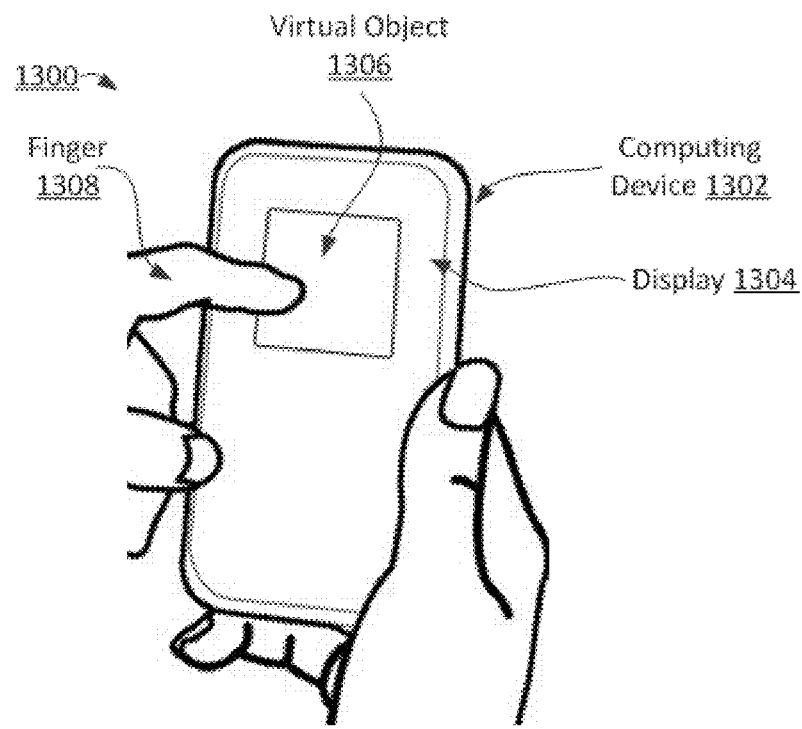
FIG. 13 shows another embodiment of an external view of a system for providing multi-output electrostatic haptic effects.

FIG. 13 shows another embodiment of an external view of a system for providing multi-output electrostatic haptic effects. In this example, system 1300 comprises a computing device 1302 with a display 1304. In some embodiments, the computing device 1302 may comprise, for example, a tablet, laptop, medical device, car computer system, or smart phone. In the example shown in FIG. 13, the display 1304 is outputting a virtual object 1306. The virtual object may comprise, for example, a button, slider, menu, icon, virtual keyboard key, or other virtual interface device. In some embodiments, a user may interact with the computing device 1302 and/or the virtual object 1306 by interacting with the display 1304 (e.g., via the user's finger 1308).

In some embodiments, upon the occurrence of an event, the system 1300 may output one or more haptic effects via the one or more ESF devices associated with the computing device 1302. For example, in some embodiments, one or more ESF devices may be associated with the display 1304. Upon the user interacting with the display 1304, the system 1300 may output an ESF haptic effect. For example, in some embodiments, the computing device 1302 may output a virtual button via the display 1304. Upon the user tapping the virtual button (e.g., with the user's finger 1308), the computing device 1302 may output haptic effect comprising, for example, a confirmation ESF effect. The confirmation ESF effect may comprise, for example, a simulated vibration. In some embodiments, the confirmation ESF effect may provide information to a user. For example, the confirmation ESF effect may confirm that the system 1300 has received the user input, that a virtual object that the user is trying to select cannot be (or has been) selected, or that the user is not interacting with the correct spot on the virtual object.

Additional Embodiments of Systems for Multi-output Haptic Effects

Figure 14A:
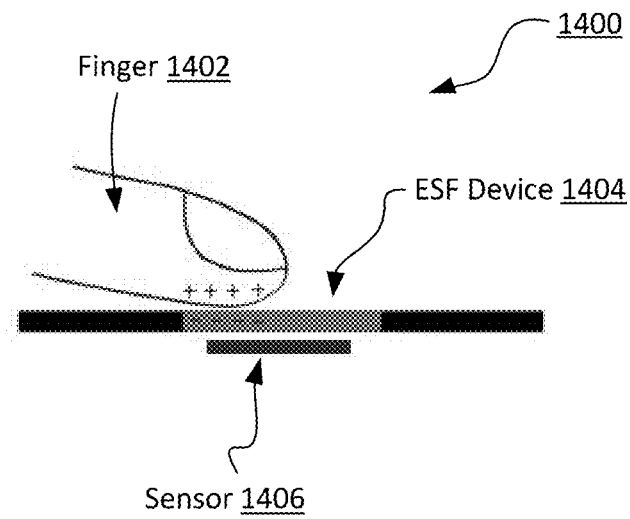
FIG. 14a shows another embodiment of a system for providing multi-output electrostatic haptic effects.

FIG. 14a shows an embodiment of an external view of a system for providing multi-output electrostatic haptic effects. In some embodiments, the system 1400 may comprise a laptop computer, desktop computer tablet, e-reader, smart phone, computing system for a car, and/or any other suitable electronic device.

Figure 14B:
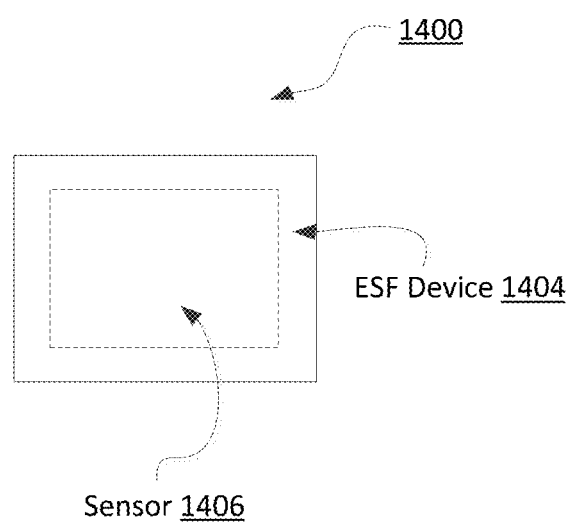

In this example, system 1400 comprises a user's finger 1402 contacting an ESF device 1404. In some embodiments, the ESF device 1404 may comprise a single ESF cell. Further, the system 1400 comprises a sensor 1406 (e.g., a capacitive, pressure, resistive, ambient light, temperature, or infrared sensor). In this example, the sensor 1406 comprises a smaller surface area than the surface area of the ESF device 1404, as shown in two dimensions in FIG. 14b.

In some embodiments, the sensor 1406 may comprise a sensor (e.g., a pressure sensor) configured to detect a contact between the user (e.g., the user's finger 1402) and the surface associated with the ESF device 1404. In some embodiments, the smaller surface area of the sensor 1406 may allow for more of a user's body (e.g., finger 1402) to contact the surface associated with the ESF device 1404 before the sensor 1406 detects the contact. In some embodiments, if the system 1400 detects a contact between a user and the area associated with the sensor 1406, the system 1400 may output a haptic effect (e.g., a dynamic ESF effect). For example, in some embodiments, the sensor 1406 may comprise a contact sensor with an area that is 75% of the size of the surface area of the ESF device 1404. If the user places a finger 1402 outside of the area associated with the contact sensor 1406, the system 1400 may not output a haptic effect. However, if the user places a finger 1402 over a location that is associated with the contact sensor 1406, the system 1400 may output a haptic effect.

In some embodiments, the pressure necessary for the sensor 1406 to detect a contact between a user (e.g., a finger 1402) and the surface associated with the ESF device 1404 may be based in part on user input, the user's identity (e.g., based on login information), demographic information (e.g., the user's age or gender), an ambient humidity, and/or other information. For example, in some embodiments, the user may input a gender. Based at least in part on the user's gender, the system 1400 may determine a pressure threshold that must be exceeded before the system 1400 outputs a haptic effect. As another example, in some embodiments, the user may input a pressure threshold that must be exceeded before system 1400 outputs a haptic effect.

In some embodiments, the sensor 1406 (e.g., a capacitive sensor) may be configured to measure an area of contact between the user's finger 1402 and a surface associated with the ESF device 1404. In some embodiments, the system 1400 may determine a haptic effect based at least in part on the sensor 1406 signal. In some embodiments, the processor may determine if the contact area between the user's finger 1102 and the surface associated with the ESF device 1104 has exceeded a threshold. In some embodiments, if such a threshold has been exceeded, the system 1400 may output a haptic effect to the user. In some embodiments, the haptic effect may comprise an ESF pulse (e.g., a 5 ms pulse) and/or random noise. Further, in some embodiments, the processor may determine if the contact area between the user's finger 1402 and the surface associated with the ESF device 1404 is below the threshold. In some embodiments, if the contact area is below the threshold, the system 1400 may stop outputting the haptic effect and/or output a different haptic effect comprising, for example, a pulse. In some embodiments, the system 1400 may output the haptic effect (e.g., the pulse) just prior to the contact area between the user's finger 1402 and the surface associated with the ESF device 1404 falling below the threshold. In some embodiments, the modulation of haptic effects based on a user's contact area exceeding or falling below a threshold may result in the user perceiving sharper haptic effect edges. That is, the boundaries of the haptic effect may be more clearly defined to the user.

For example, in some embodiments, if the processor determines that the user's finger is contacting more than 15% of the area of the surface associated with the ESF device 1404, the processor may output a haptic effect comprising, for example, a pulse followed by a simulated texture. Likewise, in some embodiments, if the processor determines that the user's finger is contacting less than 15% of the area of the surface associated with the ESF device 1404, the processor may stop outputting the haptic effect. In some embodiments, the user may perceive sharper haptic effect edges as a result of the modulation of haptic effects based the area of contact between the user and the surface associated with the ESF device 1404.

In some embodiments, the system 1400 may determine the contact area threshold based in part on the pressure of the user's body (e.g., the user's finger 1402) against the surface associated with the ESF device 1404, the speed at which the user's body is moving along the surface associated with the ESF device 1404, an ambient humidity, and/or the hydration of the user's skin. Further, in some embodiments, the threshold may be user defined. For example, in some embodiments, the user may input an amount (e.g., by percentage) of contact area between the user's finger 1402 and the surface associated with the ESF device 1404 that the sensor 1406 should detect before the system 1400 outputs a haptic effect. In some embodiments, if the threshold input by the user is surpassed, the system 1400 may output a haptic effect.

In some embodiments, the strength of the haptic effect perceived by a user may decrease as the contact area between the user's finger 1402 and the surface associated with the ESF device 1404 decreases. In some embodiments, this perceived decrease in haptic effect strength may result from the capacitive coupling between the user's finger 1402 and the ESF device 1404 decreasing. To alleviate this haptic effect perceptibility reduction, in some embodiments, the system 1400 may output haptic effects based in part on the area of contact between a user's finger 1402 and the surface associated with the ESF device 1404. In some embodiments, the system 1400 may output haptic effects with increasing magnitude as the area of contact between a user's finger 1402 and the surface associated with the ESF device 1404 decreases. Similarly, in some embodiments, the system 1400 may output haptic effects with decreasing magnitude as the area of contact between a user's finger 1402 and the surface associated with the ESF device 1404 increases. For example, in some embodiments, as a user moves a finger from the middle of a surface associated with the ESF device 1404 to its edges, less of the user's finger 1402 may be contacting the surface associated with the ESF device 1404. In response, the system 1400 may output a haptic effect with an increased magnitude, for example, double the magnitude.

In some embodiments, the system 1400 may output haptic effect signals with wave forms (e.g., sine wave, square wave, triangle wave, or saw tooth wave) and/or frequencies modulated based in part on the area of contact between a user's finger 1402 and the surface associated with the ESF device 1404. For example, in some embodiments, as a user's finger approaches the middle of the surface associated with the ESF device 1404, the system 1400 may output an ESF signal comprising a sine wave. Conversely, as the user's finger approaches the edges of the surface associated with the ESF device, in which less of the user's finger 1402 may be contacting the surface associated with the ESF device 1404, the system 1400 may output an ESF signal comprising a square wave. In some embodiments, a user may perceive a haptic effect generated from an ESF signal comprising a square wave as stronger than a haptic effect generated from an ESF signal comprising a sine wave.

Figure 15:
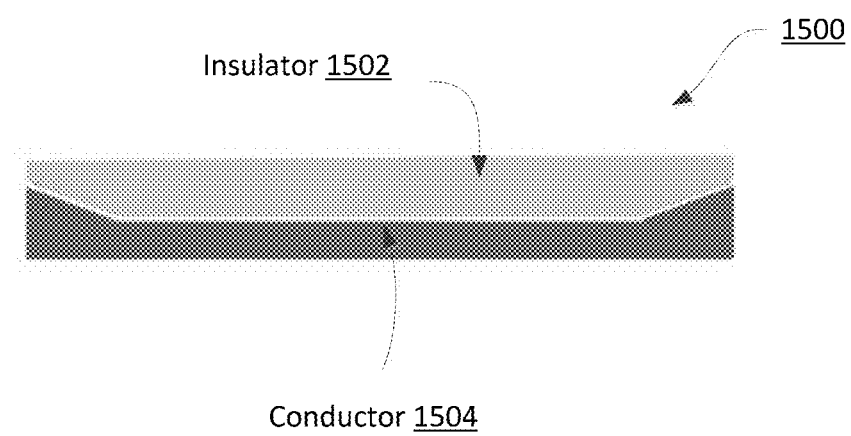
FIG. 15 shows an embodiment of a system for providing multi-output electrostatic haptic effects.

FIG. 15 shows an embodiment of an external view of a system for providing multi-output electrostatic haptic effects. In this example, ESF cell 1500 comprises an insulator 1502 coupled to a conductor 1504.

The strength of a haptic effect perceived by a user may depend on the amount of contact area between the user's finger and a surface associated with an ESF cell 1500. As a user moves a finger from the middle of the ESF cell 1500 towards the edges of the ESF cell 1500, less of the user's finger may contact the surface associated with the ESF cell 1500. In a traditional ESF cell (e.g., the ESF cell shown in FIG. 2), in which the conductor and the insulator are planar, this reduced contact area may result in the user perceiving a haptic effect with decreasing strength. The embodiment shown FIG. 15, however, may alleviate this problem.

In the example shown in FIG. 15, the thickness of the insulator 1502 tapers towards the edges of the ESF cell 1500. Conversely, the thickness of the conductor 1504 increases towards the edges of the ESF cell 1500. As a user moves a finger along the surface of the ESF cell 1500, the decreased insulator 1502 thickness at the edges of the ESF cell 1500 may allow for stronger capacitive coupling between the user and the conductor 1504. That is, in some embodiments, as the thickness of the insulator 1502 decreases, the strength of the capacitive coupling between a user's finger and the ESF cell 1500 may increase. The increased strength of the capacitive coupling may, in some embodiments, combat the effects of the decreasing contact area between the user's finger and the ESF cell 1500 on the perceived haptic effect strength. In some embodiments, this may result in the user perceiving pronounced haptic effect edges and/or a more consistent haptic effect.

Illustrative Methods for Multi-output Electrostatic Haptic Effects

Figure 16:
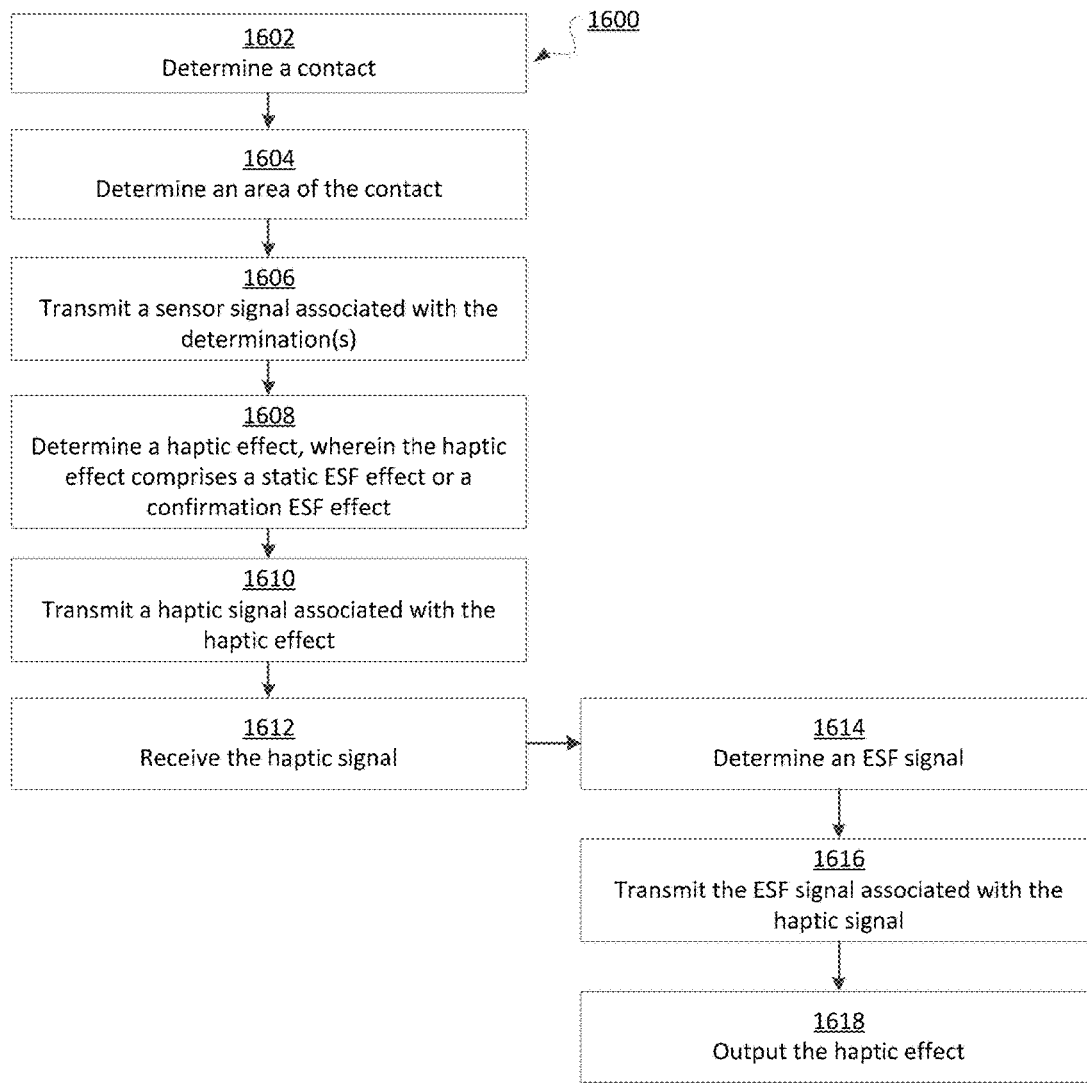
FIG. 16 is a flow chart of steps for performing a method for providing multi-output electrostatic haptic effects according to one embodiment.

FIG. 16 is a flow chart of steps for performing a method for providing multi-output electrostatic haptic effects according to one embodiment. In some embodiments, the steps in FIG. 16 may be implemented in program code that is executed by a processor, for example, the processor in a general purpose computer, a mobile device, or a server. In some embodiments, these steps may be implemented by a group of processors. In some embodiments one or more steps shown in FIG. 16 may be omitted or performed in a different order. Similarly, in some embodiments, additional steps not shown in FIG. 16 may also be performed. The steps below are described with reference to components described above with regard to system 100 shown in FIG. 1.

The method 1600 begins at step 1602 when a sensor 108 or 130 determines a contact between a user and a surface associated with an ESF device. For example, in some embodiments, a user may contact the touch sensitive surface 116 or the ESF device with a finger.

The method 1600 continues at step 1604 when the sensor 108 or 130 determines the area of the contact between a user (e.g., the user's finger) and the surface associated with the ESF device. For example, the sensor 130 may comprise capacitive sensor as described above.

The method 1600 continues at step 1606 when sensor 108 or 130 transmits a sensor signal associated with the contact determination and/or the area determination to processor 102. In some embodiments, the sensor signal may comprise an analog signal. In other embodiments, the sensor signal may comprise a digital signal.

The method 1600 continues at step 1608 when processor 102 determines a haptic effect based at least in part on the sensor signal. The haptic effect may comprise, for example, a static ESF effect or a confirmation ESF effect. In some embodiments, the haptic effect may comprise a simulated texture, a simulated vibration, a change in a perceived coefficient of friction, or a flow sensation. In some embodiments, the processor 102 may determine a plurality of haptic effects.

In some embodiments, the processor 102 may determine the haptic effect based in part on a signal from sensor 108 or 130, an event, an algorithm, or a haptic profile. For example, in some embodiments, the processor 102 may associate an incoming call notification with a haptic effect comprising a simulated vibration. In some embodiments, the processor 102 may rely on programming contained in haptic effect determination module 126 to determine the haptic effect. In some embodiments, haptic effect determination module 126 may comprise a lookup table. In some embodiments, processor 102 may use the lookup table to associate events with particular haptic effects (e.g., textures).

In some embodiments, users may have "haptic profiles" in which a user can determine and save in memory 104 a "profile" of the haptic effects the user would like associated with particular events. For example, in some embodiments, a user can select from a list of available haptic effects and associate one of these haptic effects with a real or virtual button on a user interface. In one embodiment, the list may comprise, for example, haptic effects such as fast flow sensation, slow flow sensation, intense vibration, light vibration, or textures such as bumpy, rubbery, or smooth. In such an embodiment, the processor 102 may consult with the user's haptic profile to determine which haptic effect to generate. For example, if the user's haptic profile associates interaction with the button with a fast flow sensation, in response to the user placing a finger over the button, processor 102 may determine a haptic effect in which the user perceives a fast flow sensation.

The method 1600 continues at step 1610 when processor 102 transmits a haptic signal associated with the haptic effect to the ESF controller 120. The haptic signal is based at least in part on the haptic effect. In some embodiments, the processor 102 may access drive signals stored in memory 104 and associated with particular haptic effects. In one embodiment, a signal is generated by accessing a stored algorithm and inputting parameters associated with an effect. For example, in such an embodiment, an algorithm may output data for use in generating a drive signal based on amplitude and frequency parameters. As another example, a haptic signal may comprise data to be decoded by the actuator. For instance, the actuator may itself respond to commands specifying parameters such as amplitude and frequency.

The method 1600 continues at step 1612 when the ESF controller 120 receives the haptic signal. In some embodiments, the haptic signal may comprise a digital signal. In other embodiments, the haptic signal may comprise an analog signal. In some embodiments, the ESF controller 120 may perform analog-to-digital conversion.

The method 1600 continues at step 1614 when the ESF controller 120 determines an ESF signal. In some embodiments, the ESF controller 120 may determine an ESF signal based at least in part on the haptic signal. In some embodiments, the ESF signal may comprise an amplified, inverted, or frequency-shifted version of the haptic signal. In some embodiments, the ESF controller 120 may determine a plurality of ESF signals. In some embodiments, each of the plurality of ESF signals may be configured to be output to a different ESF device and/or ESF cell.

In some embodiments, the ESF controller 120 may comprise a processor or a microcontroller. The processor or microcontroller may rely on programming contained in memory to determine the ESF signal to output to an ESF device and/or ESF cell. In some embodiments, the programming contained in the memory may comprise a lookup table. In some embodiments, the processor or microcontroller may use the lookup table to associate a haptic signal with an ESF signal to output. In some embodiments, the programming contained in the memory may comprise an algorithm. In some embodiments, the processor or microcontroller may determine the ESF signal by applying data from the haptic signal to the algorithm.

The method 1600 continues at step 1616 when the ESF controller 120 transmits an ESF signal associated with the haptic signal to haptic output device 118. In some embodiments, the ESF controller 120 may transmit a plurality of ESF signals to one or more ESF devices and/or one or more ESF cells within the one or more ESF devices. In some embodiments, the ESF controller 120 may access drive signals stored in memory and associated with particular ESF-based haptic effects or haptic signals. In one embodiment, a signal may be generated by accessing a stored algorithm and inputting parameters associated with an effect. For example, in such an embodiment, an algorithm may output data for use in generating a drive signal based on amplitude and frequency parameters. As another example, an ESF signal may comprise data to be decoded by the actuator. For instance, the actuator may itself respond to commands specifying parameters such as amplitude and frequency.

The method 1600 continues at step 1618 when haptic output device 118 outputs the haptic effect. Haptic output device 118 receives one or more ESF signals and outputs the haptic effect.

Advantages of Multi-output Electrostatic Haptic Effects

There are numerous advantages to multi-output electrostatic haptic effects. In some embodiments, multi-output electrostatic haptic effects may allow a user to perceive haptic effects without moving a body part tangentially or perpendicularly to a surface associated with a haptic output device, unlike with traditional ESF-based haptic effects. For example, traditionally, a user could only perceive dynamic ESF effects, in which the user would have to move a finger tangentially across a surface associated with a haptic output device in order to perceive the haptic effect. In some embodiments, however, the user may be able to perceive a haptic effect merely by touching (e.g., tapping or grasping) the surface comprising the haptic output device. Thus, some embodiments may allow for ESF devices to be used in new ways, such as to provide confirmatory haptic feedback (e.g., upon a user interacting with a virtual button), guidance information (e.g., that a user can or cannot press a button), or other information (e.g., about a virtual object) to a user.

Further, in some embodiments, multi-output electrostatic haptic effects may allow for isolated ESF-based haptic effects to be output at multiple contact points on a computing device simultaneously. For example, in some embodiments, multiple ESF devices may be positioned at various contact points around a computing device (e.g., a game controller) and configured to output different, isolated haptic effects upon the occurrence of an event (e.g., an explosion in a game). In some embodiments, the user may be able to perceive each isolated haptic effect independently of, or in combination with, other haptic effects. Some embodiments may provide a more realistic and immersive haptic experience for a user.

In some embodiments, manufacturers may be able to omit haptic feedback components from their computing devices, because the computing devices can be communicatively coupled to the haptic output devices. For example, manufacturers of mobile phones (e.g., smart phones), tablets, laptop computers, desktop computers, or e-readers may be able to remove haptic feedback components from within the devices, because the devices may be able to interface (e.g., via IEEE 802.11 or Bluetooth) with external haptic output devices. As a result, manufacturers may be able to produce smaller, lighter, and/or cheaper devices. Further, embodiments of the present disclosure may enable legacy devices that do not include haptic functionality to be programmed to control haptic output devices of the type described herein.

Further, some embodiments may provide ESF-based haptic effects with sharper edges. Traditionally, ESF haptic effects did not have clearly defined edges because the strength of the ESF haptic effect was dependent on the amount of contact area between a user's finger and a surface associated with an ESF haptic output device. Thus, as a user's finger moved from the edges of a surface associated with the electrostatic haptic output device to the middle, the ESF haptic effect perceived by a user started weaker and gradually became stronger. However, in some embodiments, a computing device may be able to modulate the characteristics of the ESF signal associated with ESF haptic effect, or the timing for outputting the ESF haptic effect (e.g., based on whether an area or pressure threshold is exceeded), which may provide more clearly defined haptic effect edges to a user. Further, some embodiments may comprise one or more ESF cells with a tapered insulation layer, which may provide more clearly defined haptic effect edges to a user. Providing more clearly defined haptic effect edges may, in some embodiments, allow users to more readily locate buttons or other virtual objects, and/or may provide a more realistic haptic experience to a user.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, in which other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
  a handheld device having a first contact point for gripping the handheld device and a second contact point, the first contact point being on a non-display surface of the handheld device, wherein the handheld device comprises:
    a first plurality of ESF cells positioned at the first contact point and usable to stimulate a first finger when the handheld device is gripped, each ESF cell of the first plurality of ESF cells being configured to stimulate the first finger by creating a respective electrostatic force between a respective conductor of the ESF cell and the first finger; and
    a second plurality of ESF cells positioned at the second contact point and usable to stimulate a second finger when the handheld device is gripped, each ESF cell of the second plurality of ESF cells being configured to stimulate the second finger by creating a respective electrostatic force between a respective conductor of the ESF cell and the second finger;
  a processor; and a memory on which instructions executable by the processor are stored to cause the processor to:
- determine a first haptic effect;
- transmit a first signal configured to cause the first plurality of ESF cells to output the first haptic effect;
- determine a second haptic effect; and
- transmit a second signal configured to cause the second plurality of ESF cells to output the second haptic effect.

2. The system of claim 1, wherein at least two ESF cells in the first plurality of ESF cells are positioned to interlock with one another.

3. The system of claim 1, further comprising an ESF controller configured to receive the first signal from the processor and transmit an ESF signal based on the first signal to the first plurality of ESF cells, wherein the ESF signal comprises a plurality of sinusoids with varying frequencies, each sinusoid of the plurality of sinusoids being configured to cause a different ESF cell of the first plurality of ESF cells to generate a respective ESF effect.

4. The system of claim 1, wherein the first plurality of ESF cells is positioned on a side of the handheld device and the second plurality of ESF cells is positioned on a mechanical button of the handheld device.

5. The system of claim 1, wherein the first haptic effect comprises a change in a perceived coefficient of friction, a flow sensation, a simulated texture, or a simulated vibration.

6. The system of claim 1, further comprising a sensor configured to detect a contact with at least one ESF cell of the first plurality of ESF cells and transmit a sensor signal associated with the contact to the processor; and
- wherein the memory further includes instructions executable by the processor to cause the processor to determine the first haptic effect based at least in part on the sensor signal.

7. The system of claim 6, wherein the sensor is further configured to detect a contact surface area between the finger and the at least one ESF cell; and
- wherein the memory further includes instructions executable by the processor to cause the processor to determine the first haptic effect based at least in part on the contact surface area.

8. The system of claim 6, wherein a first surface area of the sensor is smaller than a second surface area of the at least one ESF cell, and wherein the sensor is positioned beneath the at last one ESF cell.

9. The system of claim 1, wherein at least one ESF cell of the first plurality of ESF cells comprises an insulator layer having one or more edges that taper in thickness and a conductive layer having one or more edges that expand in thickness.

10. The system of claim 1, wherein the first haptic effect comprises a plurality of sub-haptic effects, and wherein the memory further comprises instructions executable by the processor to cause the processor to cause the first plurality of ESF cells to be actuated in a predetermined pattern for generating the first haptic effect.

11. The system of claim 10, wherein the first haptic effect comprises a sensation of movement, and wherein the predetermined pattern comprises sequentially actuating each ESF cell in the first plurality of ESF cells to generate the sensation of movement.

12. The system of claim 1, wherein the first plurality of ESF cells are positioned on a first side of an outer housing of the handheld device and the second plurality of ESF cells are positioned on a second side of the outer housing of the handheld device that is different from the first side.

13. The system of claim 1, wherein the second contact point is also for gripping the handheld device.

14. The system of claim 13, wherein the handheld device is a stylus, a mouse, or a controller configured to remotely control a video-game system.

15. A method comprising:
- determining, by a processor, a first haptic effect;
- causing, by the processor, a first plurality of ESF cells positioned at a first contact point on a non-display surface of a handheld device to output the first haptic effect to a first finger, each ESF cell of the first plurality of ESF cells being configured to stimulate the first finger by creating a respective electrostatic force between a respective conductor of the ESF cell and the first finger;
- determining, by the processor, a second haptic effect and
- causing, by the processor, a second plurality of ESF cells positioned at a second contact point to output the second haptic effect to a second finger, each ESF cell of the second plurality of ESF cells being configured to stimulate the second finger by creating a respective electrostatic force between a respective conductor of the ESF cell and the second finger,
- wherein the handheld device is gripped such that the first finger contacts the first contact point.

16. The method of claim 15, wherein the first plurality of ESF cells comprise interlocking ESF cells.

17. The method of claim 15, wherein the first plurality of ESF cells is positioned on a side of the handheld device and the second plurality of ESF cells is positioned on a mechanical button of the handheld device.

18. The method of claim 15, wherein causing the first plurality of ESF cells to output the first haptic effect comprises:
- transmitting, by the processor, a signal to an ESF controller;
- determining, by the ESF controller, an ESF signal based on the signal from the processor, wherein the ESF signal comprises a plurality of sinusoids with varying frequencies, each sinusoid of the plurality of sinusoids being configured to cause a different ESF cell of the first plurality of ESF cells to generate a respective ESF effect; and
- transmitting, by the ESF controller, the ESF signal to the first plurality of ESF cells.

19. The method of claim 15, further comprising:
- detecting, by a sensor, a contact with at least one ESF cell of the first plurality of ESF cells;
- transmitting, by the sensor, a sensor signal associated with the contact to the processor; and
- determining, by the processor, the first haptic effect based at least in part on the sensor signal.

20. A non-transient computer readable medium comprising program code, which when executed by a processor is configured to cause the processor to:
- determine a first haptic effect;
- transmit a first signal configured to cause a first plurality of ESF cells positioned at a first contact point on a non-display surface of a handheld device to output the first haptic effect to a first finger, each ESF cell of the first plurality of ESF cells being configured to stimulate the first finger by creating a respective electrostatic force between a respective conductor of the ESF cell and the first finger;
- determine a second haptic effect; and
- transmit a second signal configured to cause a second plurality of ESF cells positioned at a second contact point to output the second haptic effect to a second finger, each ESF cell of the second plurality of ESF cells being configured to stimulate the second finger by creating a respective electrostatic force between a respective conductor of the ESF cell and the second finger, wherein the handheld device is configured to be gripped such that the first finger contacts the first contact point.

21. The non-transient computer readable medium of claim 20, wherein the second plurality of ESF cells is positioned on a mechanical button.

22. The non-transient computer readable medium of claim 20, wherein the first signal is transmitted to an ESF controller configured to receive the first signal from the processor and transmit an ESF signal based on the first signal to the first plurality of ESF cells, wherein the ESF signal comprises a plurality of sinusoids with varying frequencies, each sinusoid of the plurality of sinusoids configured to cause a different ESF cell of the first plurality of ESF cells to generate a respective ESF effect.

* * * * *